(12) United States Patent
Zollinger et al.

(10) Patent No.: US 11,533,297 B2
(45) Date of Patent: Dec. 20, 2022

(54) SECURE COMMUNICATION CHANNEL WITH TOKEN RENEWAL MECHANISM

(71) Applicant: NETFLIX, INC, Los Gatos, CA (US)

(72) Inventors: James Mitchell Zollinger, Los Gatos, CA (US); Wesley Miaw, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 678 days.

(21) Appl. No.: 14/920,657

(22) Filed: Oct. 22, 2015

(65) Prior Publication Data
US 2016/0119291 A1    Apr. 28, 2016

Related U.S. Application Data

(60) Provisional application No. 62/068,504, filed on Oct. 24, 2014.

(51) Int. Cl.
*H04L 9/40* (2022.01)
*H04L 9/32* (2006.01)

(52) U.S. Cl.
CPC ............ *H04L 63/04* (2013.01); *H04L 9/3228* (2013.01); *H04L 9/3297* (2013.01); *H04L 63/0428* (2013.01); *H04L 63/061* (2013.01); *H04L 63/068* (2013.01); *H04L 63/083* (2013.01)

(58) Field of Classification Search
CPC ..... H04L 63/04; H04L 9/3297; H04L 63/061; H04L 9/3228; H04L 63/068; H04L 63/083
USPC ......................................................... 713/171
See application file for complete search history.

(56) References Cited

U.S. PATENT DOCUMENTS

| | | | |
|---|---|---|---|
| 6,223,287 B1 * | 4/2001 | Douglas .............. | H04L 63/0428 380/255 |
| 6,510,236 B1 | 1/2003 | Crane et al. | |
| 7,382,882 B1 | 6/2008 | Immonen | |
| 8,010,783 B1 * | 8/2011 | Cahill .................... | H04L 63/10 713/155 |
| 8,868,923 B1 | 10/2014 | Hamlet et al. | |

(Continued)

FOREIGN PATENT DOCUMENTS

| | | |
|---|---|---|
| CN | 101064695 A | 10/2007 |
| CN | 101278538 A | 10/2008 |

(Continued)

OTHER PUBLICATIONS

"ISO.8601", 1 page, Wikipedia, https://en.wikipedia.org/wiki/ISO.8601.

(Continued)

*Primary Examiner* — Dereena T Cattungal
(74) *Attorney, Agent, or Firm* — Artegis Law Group, LLP

(57) ABSTRACT

One embodiment of the present invention includes a server machine configured to establish a secure communication channel with a client machine via renewable tokens. The server machine receives a plurality of messages from a client machine over a secure communication channel, where the plurality of messages includes a first message that includes at least two of user authentication data, entity authentication data, first key exchange data, and encrypted message data. The server machine transmits, to the client machine, a second message that includes a master token comprising second key exchange data associated with the first key exchange data and at least one of a renewal time and an expiration time.

23 Claims, 8 Drawing Sheets

(56) References Cited

U.S. PATENT DOCUMENTS

| | | | |
|---|---|---|---|
| 8,880,896 B1* | 11/2014 | Elliott | H04L 9/0841 |
| | | | 713/185 |
| 8,943,311 B2 | 1/2015 | Ronda et al. | |
| 8,966,599 B1* | 2/2015 | Barrows | H04L 63/08 |
| | | | 705/37 |
| 8,977,854 B2 | 3/2015 | Lee et al. | |
| 8,996,873 B1 | 3/2015 | Pahl et al. | |
| 9,075,990 B1* | 7/2015 | Yang | G06F 21/55 |
| 9,215,232 B2 | 12/2015 | Fu et al. | |
| 9,537,899 B2 | 1/2017 | Cox et al. | |
| 10,305,871 B2 | 5/2019 | Sullivan et al. | |
| 2003/0204752 A1 | 10/2003 | Garrison | |
| 2004/0054898 A1 | 3/2004 | Chao et al. | |
| 2004/0103283 A1 | 5/2004 | Hornak | |
| 2004/0215665 A1 | 10/2004 | Edgar et al. | |
| 2005/0008158 A1 | 1/2005 | Huh et al. | |
| 2005/0216736 A1 | 9/2005 | Smith | |
| 2006/0193474 A1 | 8/2006 | Fransdonk | |
| 2006/0236096 A1 | 10/2006 | Pelton et al. | |
| 2007/0130463 A1 | 6/2007 | Law et al. | |
| 2007/0208936 A1 | 9/2007 | Ramos Robles | |
| 2008/0034216 A1 | 2/2008 | Law | |
| 2008/0165972 A1 | 7/2008 | Worthington | |
| 2008/0212771 A1 | 9/2008 | Hauser | |
| 2009/0204808 A1 | 8/2009 | Guo et al. | |
| 2009/0217033 A1* | 8/2009 | Costa | H04L 63/08 |
| | | | 713/155 |
| 2009/0265554 A1 | 10/2009 | Robles et al. | |
| 2009/0327737 A1 | 12/2009 | Hsu et al. | |
| 2010/0153709 A1* | 6/2010 | Thomas | G06F 21/445 |
| | | | 713/155 |
| 2010/0228968 A1 | 9/2010 | Wason et al. | |
| 2010/0257588 A1 | 10/2010 | Urien | |
| 2011/0126001 A1* | 5/2011 | Fu | H04L 63/06 |
| | | | 713/156 |
| 2011/0126002 A1* | 5/2011 | Fu | H04L 63/0823 |
| | | | 713/156 |
| 2011/0145900 A1* | 6/2011 | Chern | H04L 9/3271 |
| | | | 726/7 |
| 2011/0225641 A1 | 9/2011 | Wu et al. | |
| 2011/0305335 A1* | 12/2011 | Negishi | H04L 9/3242 |
| | | | 380/255 |
| 2013/0067552 A1 | 3/2013 | Hawkes et al. | |
| 2013/0086381 A1 | 4/2013 | Thomas et al. | |
| 2013/0160086 A1* | 6/2013 | Katar | H04L 63/08 |
| | | | 726/4 |
| 2013/0212704 A1 | 8/2013 | Shablygin et al. | |
| 2013/0254519 A1* | 9/2013 | Benoit | G06F 11/3051 |
| | | | 713/1 |
| 2013/0268767 A1 | 10/2013 | Schrecker | |
| 2014/0003604 A1* | 1/2014 | Campagna | H04W 12/069 |
| | | | 380/247 |
| 2014/0019753 A1 | 1/2014 | Lowry et al. | |
| 2014/0040991 A1* | 2/2014 | Potonniee | H04L 63/08 |
| | | | 726/4 |
| 2014/0215215 A1 | 7/2014 | Tanaka | |
| 2014/0237250 A1 | 8/2014 | Menezes et al. | |
| 2014/0281533 A1* | 9/2014 | de Andrade | H04L 63/08 |
| | | | 713/168 |
| 2014/0289826 A1 | 9/2014 | Croome | |
| 2015/0007265 A1* | 1/2015 | Aissi | G06F 21/60 |
| | | | 726/22 |
| 2015/0019442 A1* | 1/2015 | Hird | G06Q 20/3829 |
| | | | 705/71 |
| 2015/0082392 A1 | 3/2015 | Gregg et al. | |
| 2015/0088758 A1 | 3/2015 | Varadarajan et al. | |
| 2015/0092233 A1* | 4/2015 | Park | G06F 3/1288 |
| | | | 358/1.15 |
| 2015/0095648 A1* | 4/2015 | Nix | H04W 12/04 |
| | | | 713/170 |
| 2015/0113275 A1 | 4/2015 | Kim et al. | |
| 2015/0222604 A1* | 8/2015 | Ylonen | H04L 63/062 |
| | | | 713/171 |
| 2015/0288514 A1* | 10/2015 | Pahl | H04L 9/085 |
| | | | 713/171 |
| 2015/0312038 A1* | 10/2015 | Palanisamy | H04L 9/3213 |
| | | | 713/155 |
| 2015/0350186 A1* | 12/2015 | Chan | H04L 63/083 |
| | | | 726/9 |
| 2016/0029215 A1* | 1/2016 | Jung | H04W 12/06 |
| | | | 713/168 |
| 2016/0050291 A1* | 2/2016 | Haug | H04L 67/12 |
| | | | 709/217 |
| 2016/0065370 A1* | 3/2016 | Le Saint | H04L 9/0841 |
| | | | 713/155 |
| 2016/0105283 A1* | 4/2016 | Mityagin | H04L 63/068 |
| | | | 380/279 |
| 2016/0127902 A1 | 5/2016 | Ciarniello et al. | |
| 2016/0300043 A1* | 10/2016 | Bi | H04L 63/10 |
| 2016/0344725 A1 | 11/2016 | Severin | |
| 2017/0017957 A1 | 1/2017 | Radu | |
| 2017/0085381 A1 | 3/2017 | Richardson | |
| 2019/0097794 A1 | 3/2019 | Nix | |
| 2021/0226813 A1* | 7/2021 | Sakamoto | G06F 1/26 |

FOREIGN PATENT DOCUMENTS

| | | |
|---|---|---|
| CN | 101674304 A | 3/2010 |
| CN | 102098157 A | 6/2011 |
| CN | 103491084 A | 1/2014 |

OTHER PUBLICATIONS

"JSON Schema" 2 pages, http://json-schema.org/.

International Search Report and Written Opinion for International Application No. PCT/US2015/057213 dated Feb. 1, 2016, 13 pages.

International Search Report and Written Opinion for International Application No. PCT/US2015/057220 dated Feb. 2, 2016, 13 pages.

International Search Report and Written Opinion for International Application No. PCT/US2015/057224 dated Jun. 13, 2016, 13 pages.

Canesan, R., "Yaksha: augmenting Kerberos with public key cryptography", Network and Distributed System Security, 1995, Proceedings of the Symposium on San Diego, CA, Feb. 16-17, 1995, Los Alamitos, CA, IEEE Comput. Soc, Feb. 16, 1995, pp. 132-143, XP010134533.

Wang et al., "Joint data aggregation and encryption using Slepian-Wolf coding for clustered wireless sensor networks", Wireless Communications and Mobile Computing, Jan. 1, 2009, pp. 573-583, XP55277264.

Molva et al., "KryptoKnight authentication and key distribution system", Nov. 23, 1992, Correct System Design; [Lecture Notes in Computer Science; Lecture Notes Computer], Springer International Publishing, Cham, pp. 155-174, XP047003809.

Non-Final Office Action for U.S. Appl. No. 14/920,661 dated Jan. 2, 2018.

Final Office Action for U.S. Appl. No. 14/920,641 dated Aug. 3, 2017.

Non-Final Office Action for U.S. Appl. No. 14/920,661, dated Oct. 31, 2019, 24 pages.

Non-Final Office Action received for U.S. Appl. No. 14/920,661, dated Aug. 21, 2020, 31 pages.

Final Office Action received for U.S. Appl. No. 14/20,661, dated Feb. 11, 2021, 31 pages.

Non Final Office Action received for U.S. Appl. No. 14/920,641 dated Apr. 6, 2017, 17 pages.

Notice of Allowance received for U.S. Appl. No. 14/920,641 dated Jan. 10, 2018, 8 pages.

Notice of Allowance received for U.S. Appl. No. 14/920,641 dated Apr. 6, 2018, 13 pages.

Final Office Action received for U.S. Appl. No. 14/920,661 dated Jul. 27, 2018, 23 pages.

Non Final Office Action received for U.S. Appl. No. 14/920,661 dated Jan. 18, 2019, 16 pages.

Final Office Action received for U.S. Appl. No. 14/920,661 dated Jun. 20, 2019, 20 pages.

(56) References Cited

OTHER PUBLICATIONS

Final Office Action received for U.S. Appl. No. 14/920,661 dated Mar. 18, 2020, 27 pages.
Non Final Office Action received for U.S. Appl. No. 14/920,661 dated Jul. 9, 2021, 29 pages.
Notice of Allowance received for U.S. Appl. No. 14/920,661 dated Dec. 9, 2021, 8 pages.
Notice of Allowance received for U.S. Appl. No. 14/920,661 dated Mar. 21, 2022, 12 pages.

* cited by examiner

SECURE COMMUNICATION CHANNEL WITH TOKEN RENEWAL MECHANISM

CROSS-REFERENCE TO RELATED APPLICATIONS

This application claims the benefit of the U.S. provisional patent application titled, "MESSAGE SECURITY LAYER FOR COMMUNICATIONS OVER A NETWORK," filed on Oct. 24, 2014 and having Ser. No. 62/068,504. The subject matter of this related application is hereby incorporated herein by reference.

BACKGROUND OF THE INVENTION

Field of the Invention

Embodiments of the present invention relate generally to computer security and, more particularly, to a secure communication channel with a token renewal mechanism.

Description of the Related Art

Machines within a computer network typically employ various techniques to exchange secure messages when those machines communicate with one another in an effort to prevent third-parties from reading or tampering with the exchanged messages and potentially engaging in illegal or undesirable activities such as identity theft, corporate espionage, or stealing or compromising services. Conventional techniques to secure computer communications usually include mechanisms that ensure that a given received message has contents that are hidden from inspection, that is, encrypted, and that the received message originated from an appropriate machine within the computer network and that the content associated with a given received message was not tampered with or marginalized after being transmitted by an appropriate machine within the computer network.

Exemplary approaches for exchanging secure messages include Transport Layer Security (TLS) and predecessor Secure Sockets Layer (SSL). TSL and SSL are cryptographic protocols designed to provide communications security over a computer network for various purposes, including web browsing, email, Internet faxing, instant messaging, and voice-over-IP (VoIP). In general, TLS and SSL can be used to secure all communications between server machines offering various online services and client machines that access such online services. The TLS and SSL protocols provide privacy and data integrity during message exchange between two or more communicating computer applications executing on two or more different machines.

One such technique involves exchanging messages between two machines communicating over a secure communication channel, where the messages include a token that is passed between the two machines. For a given message, the combination of the token and cryptographic operations that can only be achieved by the parties associated with the token indicate that the message is transmitted by the intended sender of the message and received by the intended receiver of the message. The token also includes information regarding how to encrypt message data so that the data can only be decrypted by the intended recipient. Typically, the token passed between the client machine and the server machine remain the same for an entire session, which may be time limited, where a session includes an arbitrarily large number of message exchanges.

One drawback with implementing tokens in a conventional manner is that, as the duration of a session increases, the likelihood that an unintended third party intercepts and decrypts the messages also increases. Given enough time, a secure session may be "broken" by a third party and employed to decrypt messages not intended for the third party. Therefore, the longer a particular session lasts, the greater the likelihood that secure communications between two machines is compromised. In addition, a compromise to session security for a particular session applies to all communication associated with that session.

In addition, some services deployed between two or more machines over a network are associated with particular application programs. In some implementations, those application programs exchange application-specific information to enhance features for to the deployed services. For example, such application-specific information could include browse history, previously purchased items from an online store, score and level information for a computer game, and mailing or shipping addresses. This application-specific information could also include security or authentication data that the service accesses to maintain authenticated user sessions, where the security or authentication data includes sensitive information related to such user sessions. As one example, a service could store an HTTP cookie on a client machine, where the HTTP cookie could contain browse history, shopping history, authentication data, login activity, and more. When the client machine accesses a service on a server machine over a network, the client machine transmits the HTTP cookie to the server machine. The server machine may employ the information in the HTTP cookie to authenticate the user and to customize the service based on the data in the HTTP cookie.

One drawback to using application-specific security information is that, although web browsers and application programs typically implement protective measures to keep one web application from interfering with another, these application-specific information mechanisms often have known security vulnerabilities that enable malicious third parties to install infected information onto a first machine. Such infected information could, for example, intercept messages intended only for secure communications to a particular machine, and transmit the messages without encryption to the malicious third party. As a result, security is compromised when that first machine communicates with one or more other machines. In other words, even when two machines communicate securely via a shared token, if one or both machines has infected application-specific information, communications between the two machines can still be compromised due to the infected application-specific information.

As the foregoing illustrates, what is needed in the art are more effective and robust ways to transmit secure messages between two machines in a computer network.

SUMMARY OF THE INVENTION

One embodiment of the present invention sets forth a method for establishing a secure communication channel between a client machine and a server machine via renewable tokens. The method includes receiving a plurality of messages from a client machine over a secure communication channel, where the plurality of messages includes a first message that includes at least two of user authentication data, entity authentication data, first key exchange data, and encrypted message data. The method further includes transmitting, to the client machine, a second message that includes a master token comprising second key exchange data associated with the first key exchange data and at least one of a renewal time and an expiration time.

Other embodiments of the present invention include, without limitation, a computer-readable medium including instructions for performing one or more aspects of the disclosed techniques, as well as a client machine, server machine, or other computing device for performing one or more aspects of the disclosed techniques.

At least one advantage of the disclosed approach is that the master token is renewed regularly to limit prolonged and repeated use of that master token. By reducing the amount of time during which any one master token is in use, the likelihood that messages can be intercepted and decrypted by an unintended third party is also reduced. The likelihood of compromise of multiple sessions by a single compromised session is also reduced.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Techniques are described herein for authenticating and encrypting messages exchanged between client machines and server machines. The techniques are referred to herein as "message security layer" (MSL). In one embodiment, an "MSL token" may be any token which carries state information needed by a receiving entity. MSL tokens may include, without limitation, master tokens, user ID tokens, and service tokens. MSL tokens may be created on a server machine and encrypted with a server side key, where the server side key is undetectable by and unknown to all client machines, referred to herein as an opaque key.

System Overview

Figure 1:
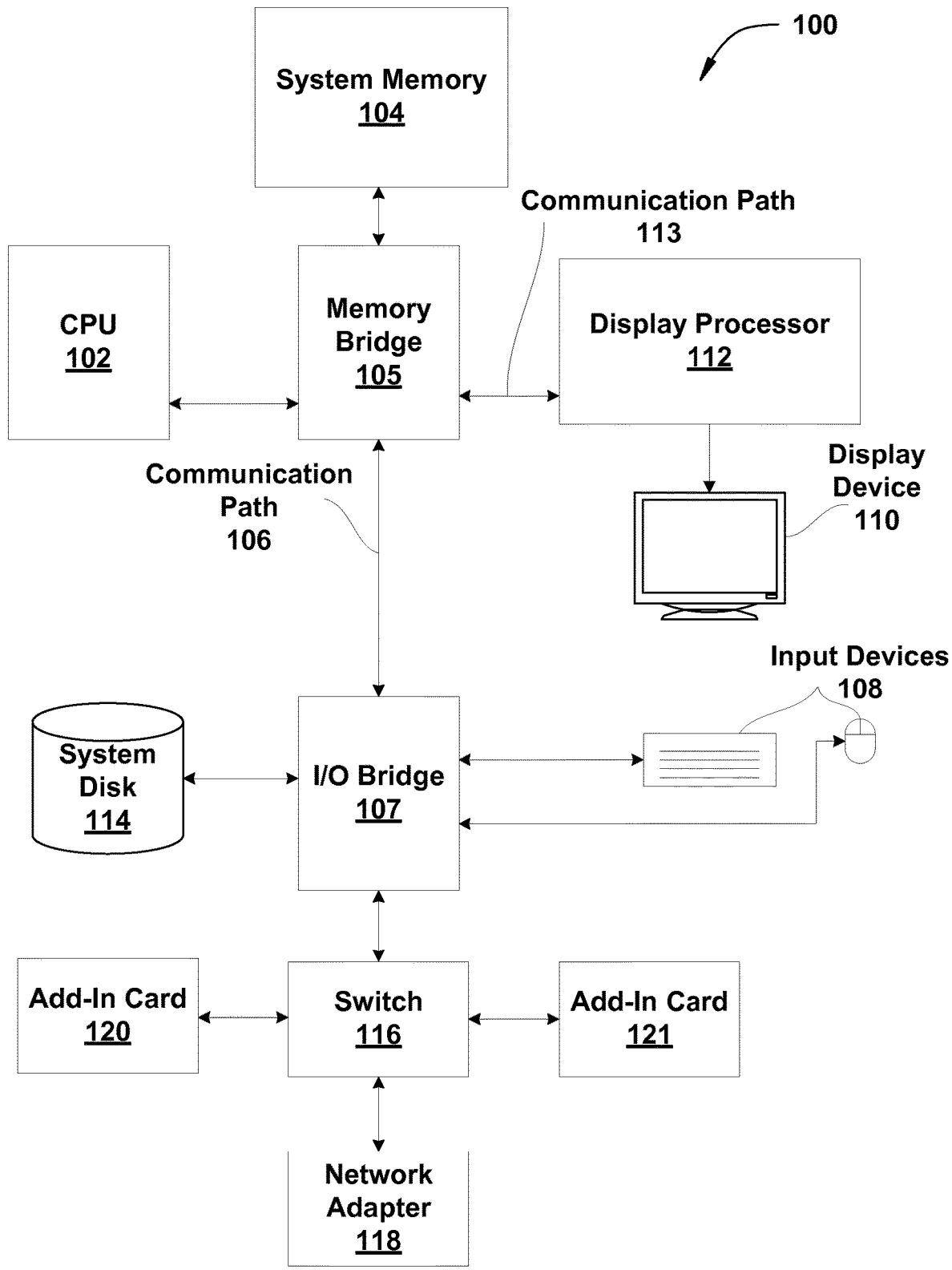
FIG. 1 is a block diagram illustrating a machine configured to implement one or more aspects of the present invention.

FIG. 1 is a block diagram illustrating a machine 100 configured to implement one or more aspects of the present invention. Machine 100 may be a personal computer, video game console, personal digital assistant, mobile phone, mobile device or any other device suitable for practicing one or more embodiments of the present invention.

As shown, machine 100 includes, without limitation, a central processing unit (CPU) 102 and a system memory 104 communicating via a bus path that may include a memory bridge 105. CPU 102 includes one or more processing cores, and, in operation, CPU 102 is the master processor of machine 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows machine 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to machine 100, via network adapter 118 or system disk 114. The render farm generates one or more rendered images of the scene using the provided instructions and/or data. These rendered images may be stored on computer-readable media in a digital format and optionally returned to machine 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including any rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Client/Server Communications Over the Network

Figure 2:
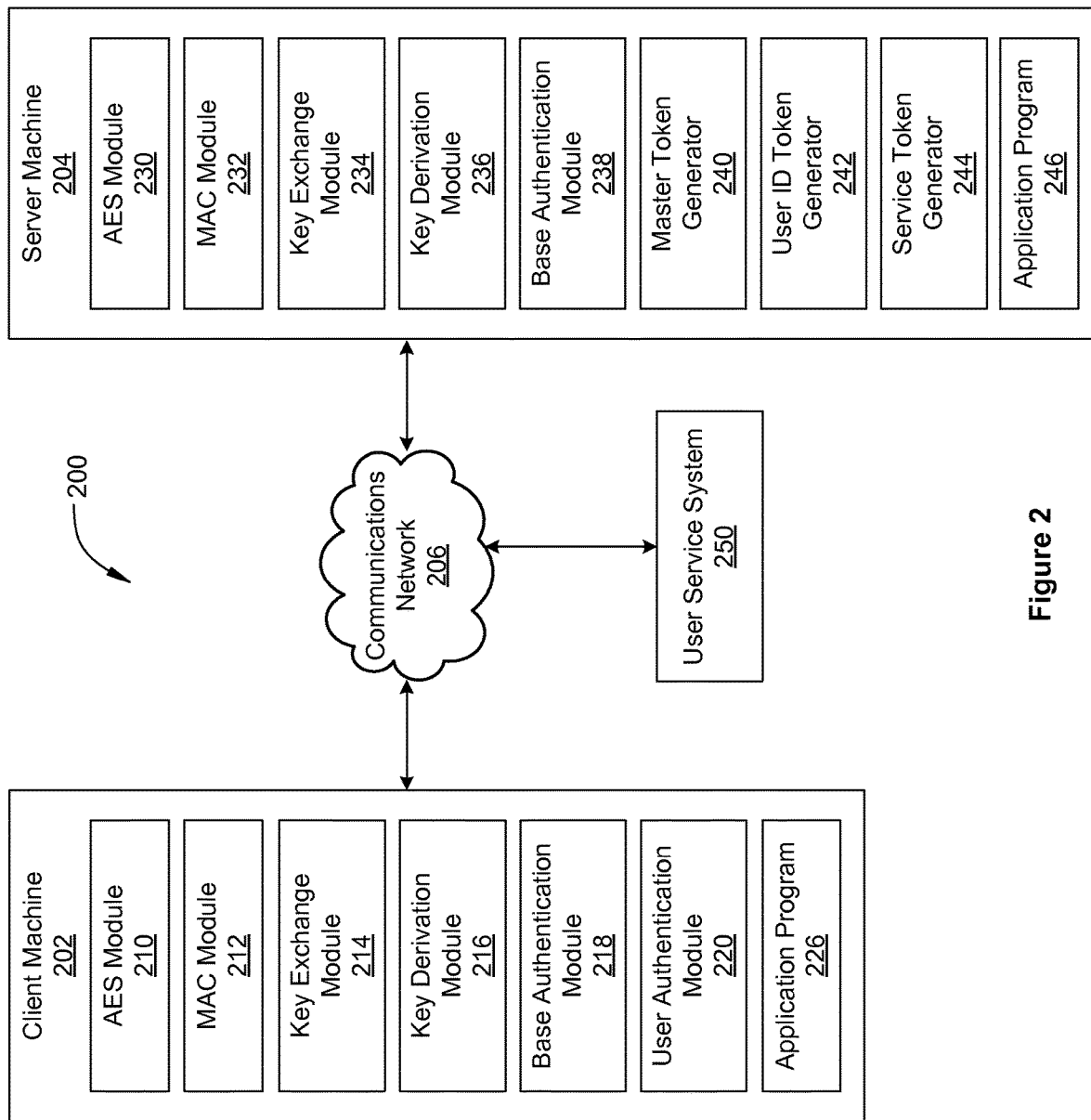
FIG. 2 illustrates a computer network configured to implement one or more aspects of the present invention.

FIG. 2 illustrates a computer network 200 configured to implement one or more aspects of the present invention. As shown, the computer network 200 includes, without limitation, a client machine 202, a server machine 204, and a user service system 250 connected to each other via a communications network 206. The communications network 206 may be any suitable environment to enable of session keys and exchange of master tokens. The second circumstance is when the server machine 204 receives a bad message from the client machine 202, as indicated by, for example, failing to decrypt data received from the client machine 202 or failing to verify an authentication code received from the client machine 202. In other words, base authentication modules 218 and 238 provide authentication on initial message exchange and as failure recovery authentication when a message failure is detected.

In various communications among remotely located machines, including, without limitation, a LAN (Local Area Network) and a WAN (Wide Area Network).

The client machine 202 is configured to exchange data with a server machine 204. In some embodiments, the client machine 202 and the server machine 204 may also communicate with one or more user service system 250s, such as user service system 250. The client machine 202 is configured to transmit messages to the server machine 204. The server machine 204 is likewise configured to transmit messages to the client machine 202. The messages exchanged between the client machine 202 and the server machine 204 include one or more of message data, authentication information, authorization information, tokens, key exchange data, authenticated data and encrypted data. In some embodiments, the client machine 202 and the server machine 204 may communicate with the user service system 250 for the purpose of user authentication, as further described herein.

The client machine 202 includes an AES module 210, a MAC module 212, a key exchange module 214, a key derivation module 216, a base authentication module 218, a user authentication module 220, and an application program 226. The server machine 204 includes an AES module 230, a MAC module 232, a key exchange module 234, a key derivation module 236, a base authentication module 238, a master token generator 240, a user ID token generator 242, a service token generator 244, and an application program 246. The functions of these various modules and token generators are now described in further detail.

The Advanced Encryption Standard (AES) modules 210 and 230 perform symmetric key cryptography on data transmitted between the client machine 202 and the server machine 204. The AES module 210 in the client machine 202 encrypts data for transmission from the client machine 202 to the server machine 204, and decrypts data received by the client machine 202 from the server machine 204. Likewise, the AES module 230 in the server machine 204 encrypts data for transmission from the server machine 204 to the client machine 202, and decrypts data received by the server machine 204 from the client machine 202.

The AES modules 210 and 230 perform two operations. The first operation encrypts plaintext into ciphertext according to equation (1) below:

$$\text{ciphertext} = \text{encrypt}(\text{plaintext}, \text{aes\_key}, \text{mode}, \text{initialization\_vector}) \quad (1)$$

where plaintext is the unencrypted text prior to encryption, aes_key and initialization_vector are parameters employed by the AES units 210 or 230 to encrypt the text according to the Advanced Encryption Standard, and ciphertext is the resulting encrypted text. In some embodiments, an initialization vector is not needed for certain cipher modes of the algorithm. Mode is a configuration parameter for encryption and decryption operations, where mode includes, without limitation, electronic code book (ECB) mode, cipher-block chaining (CBC) mode, and counter mode.

The second operation decrypts plaintext from ciphertext according to equation (2) below:

$$\text{plaintext} = \text{decrypt}(\text{ciphertext}, \text{aes\_key}, \text{mode}, \text{initialization\_vector}) \quad (2)$$

where ciphertext is the encrypted text prior to decryption, aes_key and initialization_vector are parameters employed by the AES modules 210 and 230 to decrypt the text according to the Advanced Encryption Standard, and plaintext is the resulting decrypted text. In some embodiments, an initialization vector is not needed for certain cipher modes of the algorithm. Mode is a configuration parameter for encryption and decryption operations, where mode includes, without limitation, ECB mode, CBC mode, and counter mode.

In various embodiments, the AES modules 210 and 230 may be implemented in software, hardware, or any combination of hardware or software. In particular, the AES modules 210 and 230 may be implemented in a hardware security module (HSM) or inside a trusted execution environment (TEE) for security purposes. In some embodiments, symmetric key crypto algorithms other than AES may be used. In such cases, the AES modules 210 and 230 may be replaced by an module that performs an alternative symmetric key crypto algorithms, including, without limitation, Blowfish, Twofish, and TripleDES. In various embodiments, the AES modules 210 and 230 may be stateless or stateful, depending at least on the mode.

The Message Authentication Code (MAC) modules 212 and 232 perform authentication and integrity protection associated with data transmitted between the client machine 202 and the server machine 204. The MAC module 212 in the client machine 202 generates a MAC corresponding to data for transmission from the client machine 202 to the server machine 204, and verifies a received MAC against the corresponding data received by the client machine 202 from the server machine 204. Likewise, the MAC module 232 in the server machine 204 generates a MAC corresponding to data for transmission from the server machine 204 to the client machine 202, and verifies a received MAC against the corresponding data received by the server machine 204 from the client machine 202.

In various embodiments, the MAC modules 212 and 232 may employ any technically feasible message authentication code technique, including, without limitation, keyed-hash MAC (HMAC), parallelizable MAC (PMAC), or universal hashing MAC (UMAC). By way of example only, the MAC modules 212 and 232 described herein employ HMAC.

The MAC modules 212 and 232 perform two operations. The first operation generates a MAC corresponding to particular data according to equation (3) below:

$$\text{mac} = \text{generate}(\text{data}, \text{mac\_key}, [\text{hash\_algorithm}]) \quad (3)$$

where data is the input data for which the MAC is generated, mac_key is a parameter employed by the MAC modules 212 and 232 to generate the MAC according to the selected MAC standard, and mac is the generated MAC. Typically, a generated MAC is transmitted along with the corresponding data. hash_algorithm is a parameter needed by some MAC algorithms that specifies a particular hash algorithm. For example, if the MAC module employs HMAC, the value of hash_algorithm could include, without limitation, SHA-1, SHA-256, or SHA-3. If the MAC module employs PMAC or UMAC, the hash_algorithm could be omitted.

The second operation verifies whether a given set of data generates a corresponding MAC according to equation (4) below:

$$\{T|F\} = \text{verify}(\text{data}, \text{mac}, [\text{hash algorithm}]) \quad (4)$$

where data is the data being authenticated and verified for integrity, mac is the corresponding MAC, and $\{T|F\}$ is a Boolean value that is true if the MAC modules 212 or 232 successfully verifies the MAC against the data, and false otherwise. As described above, hash_algorithm is a parameter needed by some MAC algorithms that specifies a particular hash algorithm.

In various embodiments, the MAC modules 212 and 232 may be implemented in software, hardware, or any combination of hardware or software. In particular, the MAC modules 212 and 232 may be implemented in an HSM or TEE for security purposes. The MAC modules 212 and 232 may be stateless.

The key exchange modules 214 and 234 are used to exchange keys between client machine 202 and server machine 204. In various embodiments, the key exchange modules 214 and 234 may employ any technically feasible key exchange technique, including, without limitation, Diffie-Hellman or cryptographic key wrapping methods. By way of example only, the key exchange modules 214 and 234 described herein employ Diffie-Hellman key exchange.

In the Diffie-Hellman embodiment, the key exchange module 214 in the client machine 202 generates a public value 'A' to transmit to the server machine 204, and computes a shared secret value from a private value 'a' retained by the client machine 202 and a public value 'B' received from the server machine 204. Likewise, the key exchange module 234 in the server machine 204 generates a public value 'B' to transmit to the client machine 202, and computes the shared secret value from a private value 'b' retained by the server machine 204 and the public value 'A received from the client machine 202.

The Diffie-Hellman embodiment of the key exchange modules 214 and 234 perform two operations. The first operation calculates the public values A and B from the private values a and b according to equations (5) and (6) below:

$$\text{Client public key: } A = \text{generate}(g, p) = g^a \bmod p \quad (5)$$

$$\text{Server public key: } B = \text{generate}(g, p) = g^b \bmod p \quad (6)$$

where A is the client machine 202 public value, a is the client machine 202 private value, B is the server machine 204 public value, b is the server machine 204 private value, and g (generator value) and p (prime value) are additional parameters for generating the keys.

After calculating the public keys, the key exchange module 214 transmits the public value 'A' for the client machine 202 to the server machine 204. The key exchange module 234 transmits the public value 'B' for the server machine 204 to the client machine 202. In one embodiment, the key exchange module 214 may additionally transmit the 'g' and 'p' values to the server machine 204. In another embodiment, the key exchange modules 214 and 234 may have previously shared, or otherwise agreed upon, the 'g' and 'p' values.

The second operation of the Diffie-Hellman embodiment is calculating the shared secret (ss) value according to equations (7) and (8) below:

$$\text{Client shared secret: } ss=\text{calculate}(B)=g^{ab} \bmod p = B^a \bmod p \quad (7)$$

$$\text{Server shared secret: } ss=\text{calculate}(A)=g^{ab} \bmod p = A^b \bmod p \quad (8)$$

The client machine 202 and the server machine 204 generate the same value for the shared secret. The client machine 202 generates the value of the shared secret based on 'g', 'p', the client machine 202 private value 'a', and the server machine 204 public value 'B'. Likewise, the server machine 204 generates the same value of the shared secret based on 'g', 'p', the server machine 204 private value 'b', and the client machine 202 public value 'A'.

Typically, the key exchange module 214 on the client machine 202 is stateful and the key exchange module 234 on the server machine 204 is stateless. However, in some embodiments, the key exchange module 234 may be stateful. In particular, key exchange module 214 stores 'a' as state at least until the corresponding B value is returned by the server machine 204. The key exchange module 234 calculates the 'b' value, but does not need to maintain 'b' as state. Rather, the key exchange module 234 typically discards 'b' after the server machine 204 calculates the shared secret value and transmits the B key to the client machine 202.

The key derivation modules 216 and 236 compute the session keys from the shared secret value computed by the key exchange modules 214 and 234. Each set of session keys includes two keys, namely, the HMAC key and the AES key, discussed above. The session keys are employed by various entities engaging in secure communications for the purpose of encrypting and authenticating messages. Each message created by an entity using the MSL protocol may include both authentication/integrity protection, provided by the generated HMAC using the HMAC key, and data encryption, provided by the AES key. The HMAC key provides authentication and integrity protection for exchanged messages, while the AES key provides privacy by encrypting the data in the message. The key derivation modules 216 and 236 compute the session keys according to equation (9) below:

$$\{k\_sess\_hmac|k\_sess\_aes\}=\text{key\_derive}(\text{key\_data}) \quad (9)$$

where, in the Diffie-Hellman embodiment, key_data is the shared secret computed by the key exchange modules 214 and 234 and {k_sess_hmac|k_sess_aes} is the session key, which is a concatenation of the HMAC session key and the AES session key. The key_derive function may be any technically feasibly key derivation or generation technique. In one non-limiting example, the key_derive function could be based on SHA-384, which generates 384 bits of key data. In this example, the AES session key could be the leftmost 128 bits of the SHA-384 generated key data, while the HMAC session key could be a 256 bit key that includes the rightmost 256 bits of the SHA-384 key data.

In various embodiments, the session keys may include other keys instead of or in addition to an HMAC key and an AES key.

The key exchange modules 214 and 234 may exchange, in the Diffie-Hellman embodiment, public values and may compute a "shared secret" value that is private to the corresponding client machine 202 and server machine 204.

The base authentication modules 218 and 238 provide authentication of the server machine 204 to the client machine 202 in two circumstances. The first circumstance is during the initial exchange of messages between the client machine 202 and the server machine 204 prior to the establishment embodiments, the base authentication modules 218 and 238 may employ any technically feasible authentication technique or algorithm, including, without limitation, Rivest-Shamir-Adleman (RSA) public/private keys, elliptic-curve cryptography, digital signature algorithm (DSA), or Diffie-Hellman. By way of example only, the base authentication modules 218 and 238 described herein employ RSA public/private keys.

When the server machine 204 detects a failure or when exchanging initial messages with the client machine 202, the base authentication module 238 on the server machine 204 generates a signature to transmit to the client machine 202 according to equation (10) below:

$$\text{sig}=\text{sign}(\text{data},\text{RSA\_privatekey},\text{hash\_algorithm}) \quad (10)$$

where data is the data for transmission to the client machine 202, RSA_privatekey is the private RSA key held by the server machine 204, hash_algorithm identifies a particular hash technique, as described herein, and sig is the signature for transmission to the client machine 202 along with the data.

When the client machine 202 receives the message from the server machine 204, the base authentication module 218 on the client machine 202 verifies the message according equation (11) below:

$$\{T|F\}=\text{verify}(\text{sig},\text{data},\text{RSA\_publickey},\text{hash\_algorithm}) \quad (11)$$

where sig is the received signature generated by the server, data is the corresponding received data, RSA_publickey is the public RSA key which has been pre-provisioned or previously received from the server machine 204, hash_algorithm identifies a particular hash technique, and $\{T|F\}$ is a Boolean value that is true if the base authentication modules 218 successfully verifies the signature against the data, and false otherwise.

The user authentication module 220 optionally provides user authentication from the client machine 202. When a user of the client machine 202 enters, for example, a username and password, the user authentication module 220 or the user service system 250 determines whether the user has entered valid login credentials. The user authentication module 220 may make this determination by querying locally stored password data or may query a user service system 250. The user authentication module 220 may transmit the username and password to the server machine 204. Optionally, the user authentication module 220 may encrypt or hash the password prior to querying local password data or transmitting the username and password to the user service system 250 or the server machine 204.

The master token generator 240 on the server machine 204 generates master tokens to enable the client machine 202 and the server machine 204 to exchange messages securely. The master token generator 240 generates a pre-master token according to equation (12) below:

$$\text{pre\_MT}=\text{issue}(ID,k\_sess,\text{renew\_time},\text{exptime}, \text{seq\_num},\text{MT\_ser\_num}) \quad (12)$$

where the ID is a unique identifier, k_sess is the set of session keys generated by the key derivation module 236 (previously described as the HMAC key and AES key), renew_time indicates a time at which the server may choose to renew the master token when a message from the client is received with the renewable flag set, exp_time is the time when the current master token expires, seq_num is an anti-theft sequence number that is incremented when the master token is renewed, MT_ser_num is the master token serial number for token binding purposes, and pre_MT is the generated pre-master token. The ID is one or both of a client ID and an issuer ID, where the client ID identifies the client machine 202 and the issuer ID identifies the server machine 204 that issued the master token. In one embodiment, the ID is the concatenation of the client ID and the issuer ID.

The master token generator 240 then generates the final master token according to equation (13) below:

$$MT=\text{encrypt}(\text{pre\_MT},\text{MT\_key}) \quad (13)$$

where pre_MT is the pre-master token, MT_key is a master token encryption key, such as an AES key known only to the server machine 204 and other servers that share the MT_key in order to create a network of trust, and MT is the encrypted master token.

The user ID token generator 242 verifies user authentication and issues user ID tokens. The user ID token generator 242 may verify user authentication by querying a user service system 250 using equation (14) below:

$$\{T|F\}=\text{user\_auth}(\text{user\_auth\_data}) \quad (14)$$

where user_auth_data is any technically feasible user authentication data supported by the user service system 250, such as username and password, and $\{T|F\}$ is a Boolean value returned by the user service system 250 that is true if the user authentication data is valid, and false otherwise.

If the user is authenticated, then the user ID token generator 242 generates a pre-user ID token according to equation (15) below:

$$\text{pre\_UIDT}=\text{issue}(\text{MT\_ser\_num},\text{UIDT\_renew\_time},$$
$$\text{UIDT\_exp\_time},\text{UIDT\_ser\_num},\text{user\_data}) \quad (15)$$

where MT_ser_num is the master token serial number, UIDT_renew_time indicates a time when a user ID renewable message is to be transmitted by the server machine 204, exp_time is the time when the current user ID token session expires, UIDT_ser_num is the user ID token serial number for binding purposes, user_data is user data to be encrypted, and pre_UIDT is the generated pre-user ID token. Because user authentication typically involves querying an external user server system 250, the UIDT_renew_time and UIDT_exp_time are typically longer than the corresponding master token renew_time and exp_time. The MT_ser_num is used in the generation of the user ID token to ensure that the user ID token is bound to the master token.

The user ID token generator 242 then generates the final user ID token according to equation (16) below:

$$\text{UIDT}=\text{encrypt}(\text{pre\_UIDT},\text{UIDT\_key}) \quad (16)$$

where pre_UIDT is the pre-user ID token, UIDT_key is a user token encryption key, such as an AES key known only to the server machine 204 and other servers that share the UIDT_key in order to create a network of trust, and UIDT is the encrypted user ID token.

The service token generator 244 generates and encrypts service tokens used by various services to persist state information in client stored tokens such that the server does not need to persist such state. In various embodiments, service tokens may be bound to both master tokens and user ID tokens, to master tokens only, or to no other tokens. The service token generator 244 generates pre-service tokens according to equation (17) below:

$$\text{pre\_ST}=(\text{name},\text{data},[\text{MT\_ser\_num}],[\text{UIDT\_ser\_num}]) \quad (17)$$

where name is the name of the service token and data is any arbitrary data from the corresponding service. In other words, name and data form a key-value pair, essentially operating as an HTTP cookie. Optional parameters include MT_ser_num (if the service token is bound to a master token), and UIDT_ser_num (if the service token is bound to a user UD token). pre_ST is the pre-service token.

The service token generator 244 then generates the final service token according to equation (18) below:

$$ST=\text{encrypt}(\text{pre\_ST},\text{ST\_key}) \quad (18)$$

where pre_ST is the pre-service token, ST_key is a service token encryption key, such as an AES key, and ST is the encrypted service token. In some embodiments, the service token may not be encrypted, in which case, the service token is given by equation (19) below:

$$ST=\text{pre\_ST} \quad (19)$$

The application program 226 residing on the client machine 202 and the application program 246 residing on the server machine 204 communicate securely with each other via the various modules and generators described herein in conjunction with FIG. 2. In one example, and without limitation, application programs 226 and 246 could be configured to securely stream media content between the client machine 202 and the server machine 204.

In at least one embodiment, application program 226 residing on the client machine 202 may transmit a request to establish a secure communication channel with application program 246 residing on the server machine 204. The application program 226 may transmit such a request to one or more of the modules and generators residing on the client machine 202 as described herein. In response to this request, the modules and generators residing on the client machine 202 may exchange one or more messages with the modules and generators residing on the server machine 204, thereby establishing a secure communication channel between the application program 226 residing on the client machine 202 and the application program 246 residing on the server machine 204.

Although the modules and token generators are described in a particular order, the operations performed by these modules and token generators may be performed in any technically feasible order. For example, the functions performed by the user authentication module 220 could be performed either before or after the operations performed by the base authentication modules 218 and 238. In particular, if an initialization scheme which does not support encryption is used with a user authentication scheme that requires encryption, then a key exchange may need to happen prior to initiation of user authentication in order to ensure secure data transfer. Such an approach may result in additional round-trip message exchange.

In another example, the master token generator 240, user ID token generator 242, and service token generator 244 may be implemented as separate token generators, as a single token generator that generates all three token types, or in any technically feasible combination.

In one embodiment, credential renewability may be based on an explicit "renewable" flag in order to improve threading and synchronization performance relative to prior approaches. When a time corresponding to a renewable window is reached, a sending device may include the current master token and key request data in a message that is identified as renewable. In response, a server machine may determine whether and when to renew credentials. Typically, a server machine may renew credentials at the time a message identified as renewable is received. In some cases, such as when there is a significant computational load on the server machine, the server machine may defer credential renewal until a later time. In a trusted services network, the response includes key response data containing a new master token. Authentication of the response, or of any given message, is performed via the combination of the current master token, which contains the session keys, and the usage of the session key itself. In a peer-to-peer network the response includes key response data that includes a new master token.

Each MSL token is defined as belonging to one of two types—MSL specific tokens and application-specific tokens. MSL specific tokens are those tokens provided directly by the MSL protocol, such as master tokens. The master token carries, without limitation, device or entity identity, and session keys. The metadata of the MSL protocol carries information about the remainder of the payload, including, without limitation, encryption type, and an indicator regarding whether multiple blocks, are exchanged between the client machine and the server machine. Metadata may be carried via a token or via a header.

In some embodiments, because application-specific tokens are not specifically defined within MSL, these tokens may be wrapped in a MSL message for transport. In some embodiments, an application may need a MSL-wrapped protocol to carry state information beyond what is defined in the MSL specific tokens. In such embodiments, the application may issue any number of application-specific tokens. Application-specific tokens may include, without limitation, service tokens that enable multiple services to collaborate and share state information. A particular service may communicate solely via exchanging service tokens. In general, service tokens provide the ability by which an entity may attach state or context to an entity, user, or transaction.

In various embodiments, messages may be exchanged between machines where the messages do not include a MSL-wrapped protocol. In such embodiments, machines may communication with each other by exchanging MSL packets that contain no application-specific protocol.

An application program resident on the server machine accesses data within an application-specific token by querying a MSL library to decrypt and decode the application-specific. In addition, the application program queries the MSL library to verify the relevant token in order to retrieve any encapsulated state information within application-specific token. In general, tokens are encrypted via keys accessed by the server machine. As a result, MSL tokens are opaque to the client machine. In addition, MSL tokens are integrity protected, via any technically feasible approach, including, without limitation, a cryptographic hash, MAC, HMAC-SHA256, or RSA-2048 signature of the contents of each token, based on the cryptographic context.

Any MSL token may be renewed on any request. Because every MSL token is associated with a set of session keys, a protocol using MSL allows any message to signal to the client that the master token has been updated and that the client is to use the new session keys that are negotiated upon renewal of the master token. The new session keys are returned to the requestor in one of several ways, including, without limitation: (1) the new session keys are wrapped with the device or entity key; (2) the new session keys are wrapped with the previous session key; or (3) the keys are exchanged using a key exchange mechanism such as Diffie-Hellman. The server machine controls which of these mechanisms is used.

A master token includes an entity identity and session keys. The entity identified within the master token is referred to as the master token entity. The sender of a message may request the establishment of session keys for use with future MSL transactions. To request session keys, the sender includes one or more key request data in the MSL header of the request. The recipient then issues or renews a master token and session keys, and returns the session keys and/or associated data to the sender by including key response data in the MSL header of the response.

When renewing a master token, the issuing entity has an opportunity to decide if the master token should be renewed or not. The issuing entity may elect to not renew the master token if the master token may no longer be recognized or if the existing master token may no longer be trusted. After the master token is issued or is renewed, the sender is able to identify itself using the master token. In some embodiments, a server machine may issue multiple master tokens, where each master token identifies a different context or personality, referred to herein as a micro-service, that may be adopted by the server machine. Such different micro-services may correspond to different applications, different versions of the same application, etc. Each client machine may communicate with the server machine via any one or more master tokens in current use by the server machine. In this manner, each client machine may communicate with the server machine to access any one or more micro-services offered by the server machine. Stated another way, each client machine and each server machine may adopt more than one context or personality at any given time, where each context or personality corresponds to a different micro-service, or a different version of the same micro-service, in any combination. Similarly, in a peer-to-peer network, any one or more peer machines may adopt more than one context or personality at any given time, where each context or personality corresponds to a different micro-service, or a different version of the same micro-service, in any combination.

Successful decryption and authentication of the message by the recipient authenticates the identity of the issuing entity as contained in the master token. Stated another way, authentication is performed via the combination of the current master token, which contains the session keys, and the usage of the session key itself. The MSL header of a message associated with a particular master token is encrypted via the session encryption key and authenticated via the session authentication key. In one embodiment, AES/CBC/PKCS5Padding with an AES-128 key is used with a random IV for encryption and HMAC-SHA256 is used for authentication. However, any other technically feasible keys and modes may be used within the scope of the present invention.

In some embodiments, secret keys are used by the issuing entity to encrypt the master token session data and generate the master token verification data. As a result, other entities that may intercept the messages are not able to decrypt the master token session data or generate the master token verification data unless they also have access to these secret keys. In general, the secret keys should be adequately protected in order to prevent unauthorized access of the keys, resulting in a compromise of secure communication involving master tokens. In addition, the secret keys may be periodically rotated to further prevent unauthorized access of the keys.

The recipient of an issued master token is expected to persist, or maintain, the master token and associated session keys. After the master token has been successfully renewed, the master token entity discards the previous master token and session keys once all outstanding messages associated with the previous master token and session keys have been processed. In some embodiments, the issuing entity may also persist, or maintain, the master token and associated session keys that are issued by the issuing entity. In such embodiments, the issuing entity may recreate the session keys from the master token included on received messages.

In some embodiments, MSL tokens may also include user ID tokens, where a user ID token contains a user identity. The sender of a message requests user authentication by including user authentication data in the MSL header of the request. The recipient then issues a user ID token and returns the user ID token to the sender by including the user ID token in the MSL header of the response, or via any technically feasible approach.

In some embodiments, at specified intervals, a message may include both user authentication data and a user ID token to confirm that the user is still in possession of the correct user credentials and that the user credentials have not been revoked. In such cases, if the user authentication data and user ID token do not both identify the same user, the message is rejected. The frequency at which such a message is transmitted may be selected to achieve a balance between confidence of a user's identity and the cost of performing user authentication, as determined by the entity that receives the message.

Updates or renewals of MSL tokens, and in particular of the master token, operate in an environment where multiple parallel threads operating on one or both of the client machine and server machine concurrently communicate with one or more backend services. In order to properly handle threading and synchronization in a multi-threaded environment, MSL employs the following procedure when updating or renewing the master token. A single thread executing on the client machine is responsible for transmitting and receiving asynchronous requests and responses over the various protocols which use MSL. In a series of parallel requests, the thread responsible for transmitting and receiving requests only has only one outstanding request that has been marked as "renewable" at any given time. If all requests are transmitted in series, then each request is marked as renewable. When the response for the request marked "renewable" is received, the "renewable" flag is set for the very next request, even though there may be a series of parallel requests sent prior that do not yet have corresponding responses. In this manner, the client machine and the server machine avoid contention for making updates to the master token and associated keys.

The server machine tracks two time values for every master token—the renewal time and the expiration time, where the renewal time is before the expiration time. The renewal time denotes the earliest time when the server machine may renew a master token upon receiving a request with the "renewable" flag set. The expiration time denotes the time after which the server machine no longer accepts a request for the current master token. After the expiration time, a request transmitted to the server machine does not succeed unless the server machine is able to create a new master token. Creation of a new master token generally requires validation of the device or entity, to identify and validate the entity requesting the master token. In various embodiments, a request for a new master token also includes user information. In such embodiments, creation of a new master token also requires validation of the user associated with the request, to identify and validate the user requesting the master token.

During the period after the renewal time and prior to the expiration time, the server generally updates the master token only upon receiving a request with the "renewable" flag set. If the server machine receives a request during this period with the "renewable" flag not set, the request succeeds, but without renewing the master token.

In one embodiment, service tokens for other services may be accommodated via issuing of service tokens. Service tokens are a means by which an entity may attach state or context to another entity, user, or transaction. Service tokens are similar to HTTP cookies, but may be optionally bound to a specific master token and/or user ID token, by the master token serial number and user ID token serial number, respectively, to prevent unauthorized use. In some embodiments, service tokens only include data that is independent of other service token data. Service tokens may be verifiable and/or encrypted. Verified tokens carry the data to detect tampering. Encrypted tokens contain encrypted data.

In some embodiments, application-specific keys or service-specific keys may be used to encrypt the service token data and generate the service token verification data. An entity other than the issuing entity may decrypt the service token data or generate the service token verification data if such an entity has access to the corresponding keys. An entity may also consume unencrypted token data of an unverified service token. The secret keys for encrypting and decrypting service tokens may be periodically rotated.

The service token management logic differs depending on the type of MSL network and entity involved. In a trusted services network, the client is responsible for maintaining local state associating service tokens with master tokens and user ID tokens. The client makes sure to include the correct service tokens in any messages the client creates. Trusted services servers are not responsible for maintaining any state and will modify or echo the set of service tokens received from the client. In a trusted services network, all services are implicitly considered as trusted. On the other hand, all clients are implicitly untrusted. The extent of the trust between services typically extends only to other services sharing cryptographic keys allowing the validation, decryption and creation of service tokens.

In a peer-to-peer network, both entities are responsible for maintaining local state associating service tokens with the master tokens and user ID tokens. That is, if a first peer machine issues one or more service tokens, then other peer machines that receive the service tokens issued by the first peer machine are responsible for maintaining the state of such service tokens. Each peer machine that communicates with the first machine includes the service tokens issued by the first peer machine in each message transmitted to the first peer machine.

Because, entities are permitted to send messages in parallel, receiving application programs are prepared to accept messages that include old service tokens. Since multiple services or service instances may issue service tokens with the same name, there is no mechanism by which MSL can identify a newer service token versus an older one without imposing data synchronization requirements upon services. Therefore, although synchronization is used to ensure the local service token state remains consistent, there is no requirement that the state be atomically updated with a single message's service tokens. In some embodiments, service token updates may be interleaved as a result receiving two messages with service token update requests.

The service data is opaque to the MSL stack and transmitted as binary information. If the encrypted flag is true, then the service data has been encrypted using an application- or service-specific encryption key. If a compression algorithm is specified, then the service data has been compressed prior to encryption. If the service data of a service token is empty, then the service token may be deleted and excluded from all future messages.

When creating a message all applicable service tokens are included by default. The set of applicable service tokens includes, without limitation: (1) all service tokens that are not bound to a master token or user token; (2) all service tokens that are bound to the master token used by the message and are not bound to a user ID token; (3) all service tokens that are bound to both the master token and user ID token used by the message; and (4) all service tokens that are bound to only the user ID token. In various embodiments, the application program may exclude individual service tokens by name, add new service tokens, or specify tokens for deletion prior to sending the message. Note that excluding a service token from a message is different than deleting one. If a service associated with an application program wants the master token entity to delete a service token, the service transmits a new service token with the same name but with an empty string as token data. The master token entity then removes any instances of the service token from local state and does not include the service token on any further messages created by the master token entity.

In one embodiment, user ID tokens and service tokens may be coupled or bound to the master token by using the unique master token serial number. If a master token serial number is inserted into a user ID token, then the user ID token is bound to the corresponding master token. Likewise, if a master token serial number is inserted into a service token, then the service token is bound to the corresponding master token.

In some embodiments, credential renewability may be based on two time values. Master tokens contain a renewal time and an expiration time. The renewal time identifies the time after which a master token may be renewed if the message renewable flag is also set. The expiration time identifies the time after which messages using master token authentication are no longer accepted unless the message renewal flag is also set and the resultant renewal attempt succeeds. The values assigned for the renewal window and expiration should strike a balance between frequent renewal which is somewhat expensive and minimizing session key use for increased security.

Figure 3:
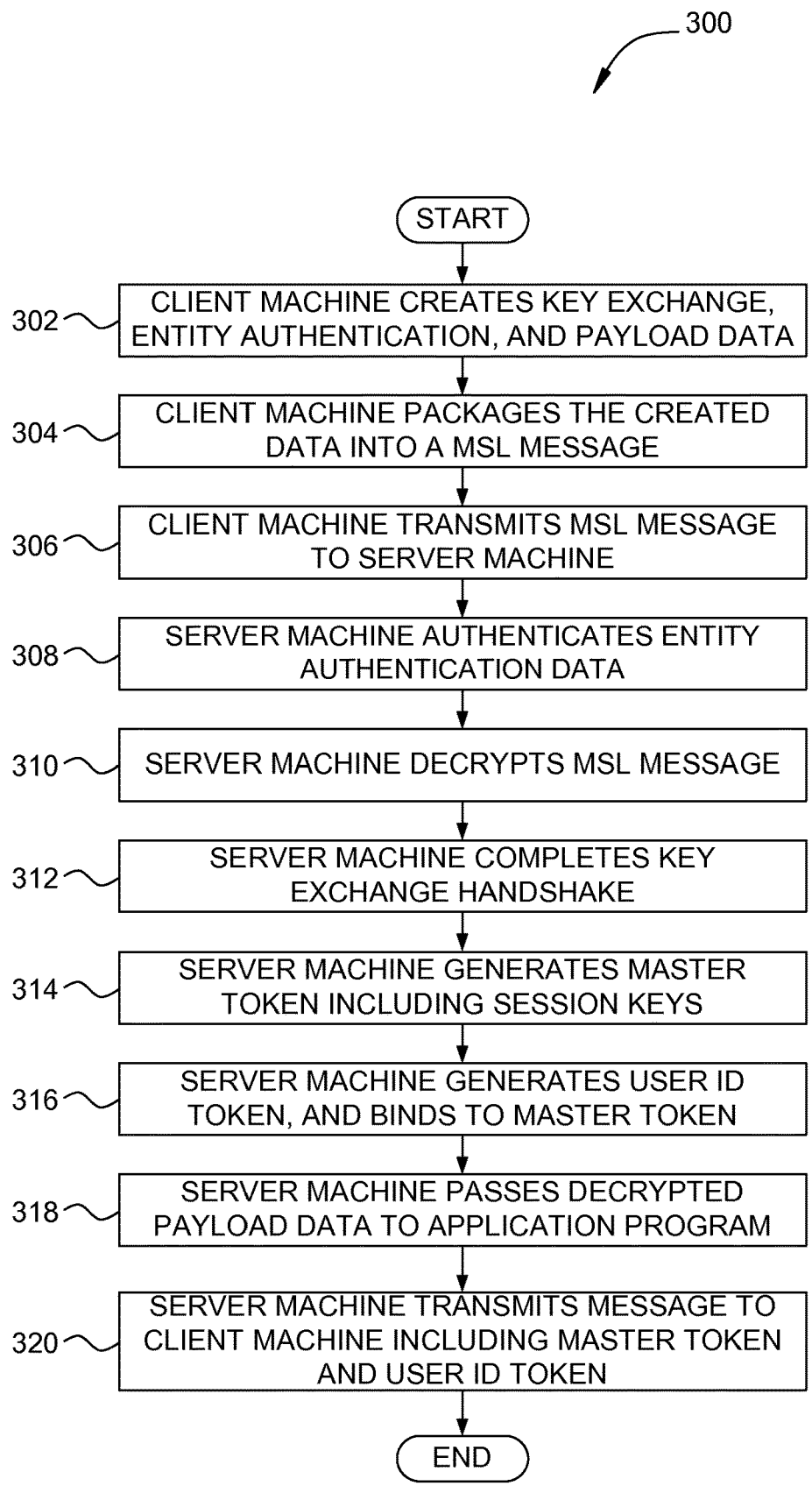
FIG. 3 is a flow diagram of method steps for establishing a secure communication channel between a client machine and a server machine via renewable tokens, according to one embodiment of the present invention.

FIG. 3 is a flow diagram of method steps for establishing a secure communication channel between a client machine and a server machine via renewable tokens, according to one embodiment of the present invention. Although the method steps are described in conjunction with the systems of FIGS. 1-2, persons of ordinary skill in the art will understand that any system configured to perform the method steps, in any order, is within the scope of the present invention.

As shown, a method 300 begins at step 302, where a client machine 202 creates key exchange data, entity authentication data, and payload data. In some embodiments, the client machine 202 also creates user authentication data. At step 304, the client machine 202 packages the key exchange data, entity authentication data, payload data, and, if applicable, user authentication data, into a MSL message based on keys that are pre-shared, or pre-provisioned, between the client machine 202 and a server machine 204. Packaging the data into the MSL message involves: (a) encryption of the MSL message using a pre-provisioned client encryption key; and (b) authentication of the encrypted MSL message using a pre-provisioned authentication key. The authentication may be accomplished via any technically feasible approach, including, without limitation, HMAC, RSA signature, and ECC signature. At step 306, the client machine 202 transmits the encrypted and authenticated MSL message to the server machine 204.

At step 308, the server machine 204 authenticates the entity authentication data. In some embodiments, the server machine 204 also authenticates the user authentication data. At step 310, the server machine 204 decrypts the MSL message using the pre-shared encryption key. At step 312, the server machine 204 completes the key exchange handshake, producing key exchange data to return to the client, and generates the session keys. At step 314, the server machine 204 generates the master token, where the master token includes the session keys. In various embodiments, the master token may also include, without limitation, an identifier (ID) associate with one or both of a client machine 202 ID and a master token issuer ID, a master token renewal time, a master token expiration time, a sequence number, and a master token serial number. At step 316, the server machine 204 generates a user ID Token and binds the user ID token to the master token using the master token serial number. In various embodiments, the user ID token may include a master token serial number, a user ID expiration time, a user ID renewal time, a user ID serial number, and user data. At step 318, the server machine 204 passes the decrypted payload data to an application program for processing. At step 320, the server machine 204 transmits a message to the client machine that includes key exchange data that, in turn, includes the master token. The message further includes the user ID token. The method 300 then terminates.

In some embodiments, the server machine 204 and the client machine 202 may not have exchanged pre-shared keys. In such embodiments, the client machine 202 may create key exchange data, but may not create user authentication data or payload data at this initial step. The client machine 202 may package the key exchange data into a MSL message for the sole purpose of key exchange. The client machine 202 may send the MSL message to the server machine 204.

The server machine 204 may complete the key exchange handshake by producing key exchange data to return to the client and may generate the session keys. The server machine 204 may generate the master token, where the master token includes the session keys. The server machine 204 may return the master token to the client machine 202.

The client machine 202 may then create user authentication data and payload data. The client machine 202 may package the payload data along with the master token and may create a MSL message. The creation of the MSL message may involve: (a) encryption of the MSL message using an encryption key created during key exchange; and (b) authentication of the encrypted MSL message using a MAC key created during key exchange. The client machine 202 may transmit the encrypted and authenticated MSL message to the server machine 204.

The server machine 204 may decrypt the master token to retrieve the session keys needed to authenticate and decrypt the MSL message from the client. The server machine 204 may authenticate the MSL message using the MAC key retrieved and decrypted by the server machine 204. The server machine 204 may decrypt the MSL message using the encryption key retrieved and decrypted by the server machine 204. In addition, the server machine 204 may authenticate the user authentication data, if provided. Typically, the server machine 204 authenticates the user authentication data after decrypting the master token and validating the MSL message. The server machine 204 may generate a user ID token and bind the user ID token to the master token using the master token serial number. The server machine 204 may pass the decrypted payload data to the application program for processing.

In some embodiments, one or more steps in the above-described flows may fail. In such embodiments, the server machine 204 may enter a quasi-secure failure recovery mode. In so doing, the server machine 204 may transmit, to the client machine 202, a plaintext, that is, non-encrypted, MSL message that includes logging and error information. The server machine 204 may also include a digital signature in the MSL message based on a pre-shared public key that has been previously deployed to the client machine 202. This digital signature may be based on RSA, ECC, or any other technically feasible digital signature algorithm that relies on public key cryptography. Because of this digital signature, the client machine 202 may trust the unencrypted MSL message. If the client machine 202 has corrupt client credentials, this mechanism may be used to recover and reestablish a secure communication channel. The server machine 204 may cause a client in a corrupt state to initiate the flow described above in conjunction with FIG. 3 for cases where the client machine 202 and the server machine 204 have "pre-shared" keys.

Figure 4A:
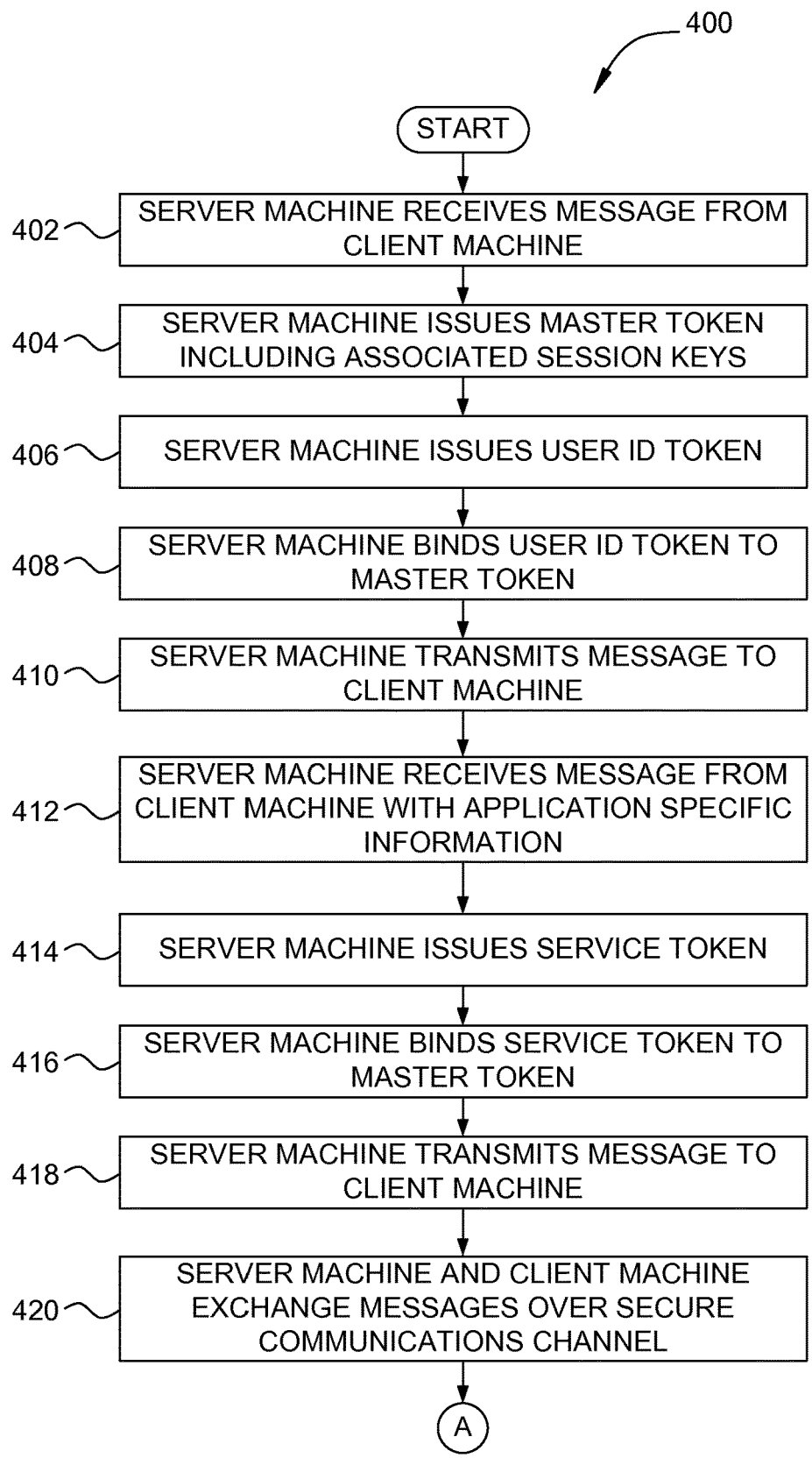
FIGS. 4A-4B set forth a flow diagram of method steps for establishing a secure communication channel between a client machine and a server machine via renewable tokens, according to another embodiment of the present invention.
Figure 4B:
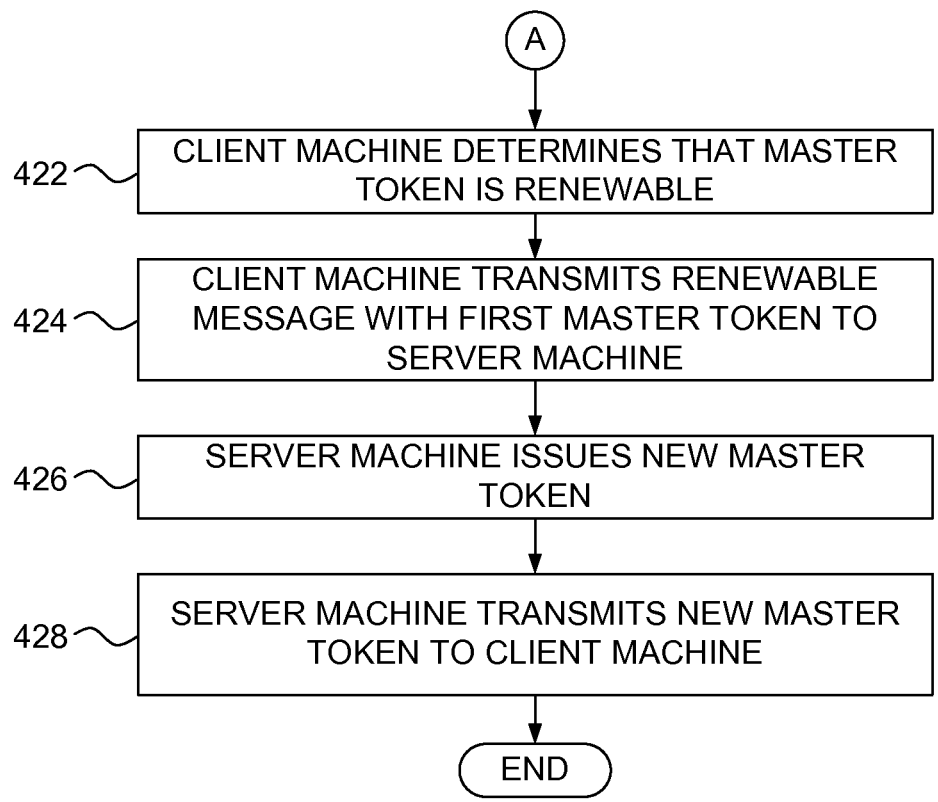

FIGS. 4A-4B set forth a flow diagram of method steps for establishing a secure communication channel between a client machine and a server machine via renewable tokens, according to another embodiment of the present invention. Although the method steps are described in conjunction with the systems of FIGS. 1-2, persons of ordinary skill in the art will understand that any system configured to perform the method steps, in any order, is within the scope of the present invention.

As shown, a method 400 begins at step 402 where the server machine receives a message from the client machine that includes entity authentication data associated with the client machine along with key request data. The entity authentication data identifies the client machine to the server machine, while the key request data is a request to exchange session keys for a new secure communications session. In some embodiments, if the scheme employed to initiate communications includes encryption, then the message may be encrypted and may additionally include user authentication data and payload data. At step 404, the server machine issues a master token associated with the key exchange data. The master token includes a set of associated session keys. In some embodiments, the master token also includes an entity identifier that identifies one or both of the server machine and the client machine. At step 406, the server machine issues a user ID token associated with the user authentication data. The user ID token includes an identifier associated with a user. At step 408, the server machine binds the user ID token to the master token. In some embodiments, steps 406 and 408 occur simultaneously or in concert with each other. In some embodiments, one or both of the master token and the user ID token may include state information associated with the client machine. The state information may be maintained by one or both of the server machine and the client machine. At step 410, the server machine transmits a message to the client machine that includes the master token, the session keys, and the bound user ID token. A secure communication channel is now established between the client machine and the server machine.

At step 412, the server machine receives a message from the client machine that includes application-specific information associated with a particular service. At step 414, the server machine issues a service token that includes a data set specified by the service. In various embodiments, the data set may be derived from the application-specific information received from the client machine via the message or may be derived from third party information associated with the particular service. At step 416, the server machine binds the service token to one or both of the master token and the user ID token. At step 418, the server machine transmits a message to the client machine that includes the master token, the session key exchange data, the bound user ID token, and the bound service token. At step 420, the server machine and the client machine exchange one or more additional messages over the secure communication channel.

At step 422, the client machine determines that the master token is renewable. In some embodiments, determining that the master token is renewable includes determining that a current time is greater than a renewal time associated with the first master token and less than an expiration time associated with the master token. In general, determining that the first master token must be renewed includes determining that a current time is greater than an expiration time associated with the master token. At step 424, the client machine transmits a message to the server machine, where the message is identified as renewable. At step 426, the server machine issues a new master token including a new set of session keys. At step 428, the server machine transmits a message to the client machine, where the message includes the new master token and the key exchange data associated with the session keys. The method 400 then terminates.

Figure 5:
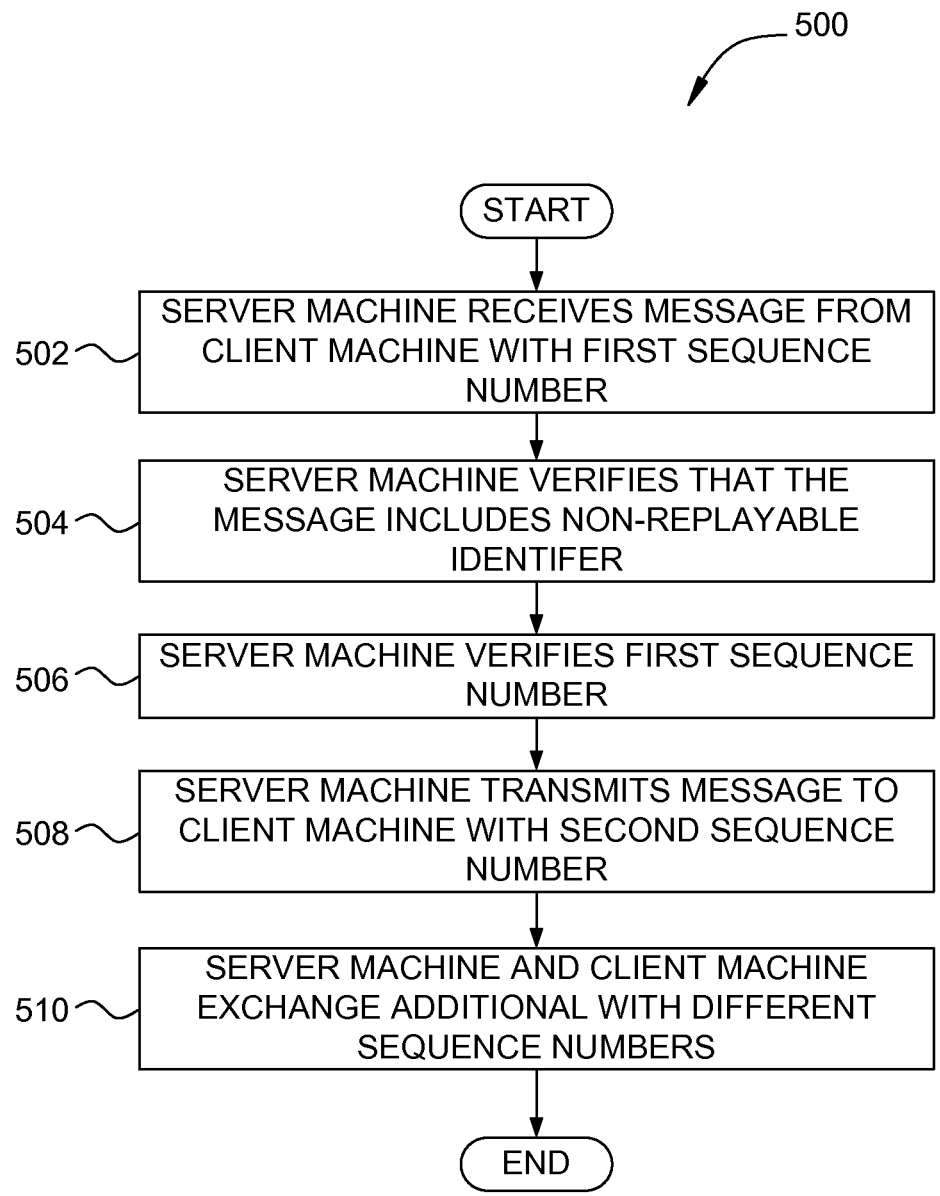
FIG. 5 is a flow diagram of method steps for exchanging secure messages having sequence numbers, according to one embodiment of the present invention.

FIG. 5 is a flow diagram of method steps for exchanging secure messages having sequence numbers, according to one embodiment of the present invention. Although the method steps are described in conjunction with the systems of FIGS. 1-2, persons of ordinary skill in the art will understand that any system configured to perform the method steps, in any order, is within the scope of the present invention.

As shown, a method 500 begins at step 502 where the server machine receives a message from a client machine, where the message includes a master token that, in turn, includes a first sequence number. At step 504, the server machine verifies that the received message includes a non-replayable identifier. At step 506, the server machine verifies that the first sequence number corresponds to a previously generated and stored sequence number. In some embodiments, verifying that the first sequence number corresponds to a previously generated and stored sequence number may include verifying that the first sequence number and the previously generated and stored sequence number are equal to one another. In other embodiments, verifying that the first sequence number corresponds to a previously generated and stored sequence number may include verifying that the first sequence number and the previously generated and stored sequence number are within an allowable range of one another. In some embodiments, the previously generated and stored sequence number may be inaccessible to the client machine, that is, the sequence number may be in the master token. In some embodiments, the server machine may receive one or more additional messages from the client machine prior to either or both of the verification steps 504 and 506.

At step 508, the server machine transmits a message to the client machine that includes the master token that, in turn, includes a second sequence number, where the second sequence number is different from both the first sequence number and the previously stored sequence number. At step 510, the server machine and the client machine exchange additional messages, each message exchange associated with a different sequence number. In some embodiments, the sequence numbers for consecutive message exchanges form a monotonically increasing series of sequence numbers. The method 500 then terminates.

In one embodiment, a token anti-theft mechanism is employed that accommodates eventual consistency. Master tokens include a sequence number to prevent entity cloning. When a master token is renewed, the master token sequence number is incremented by 1, and this value may be saved by the issuing entity as the newest master token sequence number. The issuing entity generally checks the value of this sequence number when renewing the master token. In some embodiments, if the sequence number found in the master token does not match the expected value, then the issuing entity may classify this condition as abuse and disallow the request. The issuing entity may wish to allow master tokens with old sequence numbers to be renewed (within a small window of defined as one or both of a range of time and a range of sequence numbers), to address the case where a master token entity may have lost a master token due to communication or storage failures. By closing this window once it is known that the master token entity has received the master token, the potential for abuse is limited. In most cases the new master token's sequence number will be one larger than the sequence number previously saved by the issuing entity. The issuing entity will save the new sequence number when issuing the new master token.

In some embodiments, a client machine may transmit two messages in parallel, where each of the messages is marked as renewable and the messages have consecutive sequence numbers. In response to receiving one of the two messages, the server machine may issue a new master token and may transmit the new master token to the client machine. When the server machine receives the second of the two messages, the server machine may recognize that the message includes a master token that is no longer valid. If the message is received within a tolerance window, then the server machine may accept the second message and respond accordingly. If the message is not received within the tolerance window, then the server machine may reject the message and transmit a rejection message to the client machine. In response, the client machine may retransmit the second message with the newly issued master token.

The issuing entity may also wish to check the renewal time and the expiration time when renewing master tokens to ensure that a very old master token with the correct sequence number is not accepted for renewal after the master token sequence number has wrapped around. Such an occurrence is unlikely to occur in practice unless master tokens are renewed with extremely high frequency.

When in possession of multiple master tokens, the token with the highest sequence number should be considered the newest token. In one embodiment, the sequence number space is signed 53-bit numbers, if a sequence number is smaller by more than 45-bits (i.e. the new sequence number is <128 and the old sequence number is $2^{53}$), it is considered the newest token. New session keys are created when renewing the master token.

In one embodiment, a client machine driven/server machine enforced approach may be deployed for anti-replay. To protect against replay, a response to a message includes a master token with a message ID in the form of a sequence number. The sequence number has been incremented by one relative to the sequence number found in a corresponding request. The receiver of the message compares the sequence number with a sequence number that has been previously stored by the receiver. The stored sequence number represents the expected value of the sequence number of the response message. If the sequence number of a response message does not equal the expected value, or is not within an allowed range of the expected value, then the receiving entity rejects the message.

Each time the server machine renews the master token, the server machine increments an anti-theft sequence number associated with the requesting device or entity, and stores the anti-theft sequence number in a database. In addition, the server machine stores a time stamp of when the master token was last updated. When the server machine returns a new master token, the server machine also returns the sequence number to the client machine. This approach allows the client machine to store the last updated master token in cases where the master token has been updated multiple times on parallel threads.

When a set of parallel requests are processed and one or more requests are sent with an expired master token, then the server machine issues new master tokens for each incoming request that was sent with the expired master token. Because the sequence number is returned with each response, the client machine can save the most recently updated master token.

In some embodiments, the server machine may respond to all requests with the same sequence number. In such embodiments, the client machine may persist or maintain any of the returned master tokens. In some embodiments, the server machine only increments the sequence number if a renewal has not occurred since a time defined by the renewal time plus or minus a specified threshold value. In some embodiments, the overhead associated with renewing several master tokens in parallel may be reduced by one or more of the following techniques: (1) the client machine is programmed to transmit a single serialized request on startup; and (2) the client machine tracks the renewal time and the expiration time, and serializes a single request only if the master token has expired.

In one embodiment, certain prior approaches to secure messaging over a network rely heavily on maintaining accurate client time on client machines, which may be difficult and expensive. By contrast, the approaches described herein rely on sequence numbers communicated from the server machine to the client machine and issuing entity/server time maintained in tokens which are opaque to the receiving entity, eliminating reliance on client machine time to maintain secure communications. As a result, communications between the client machine and the server machine are more reliable and secure.

Figure 6:
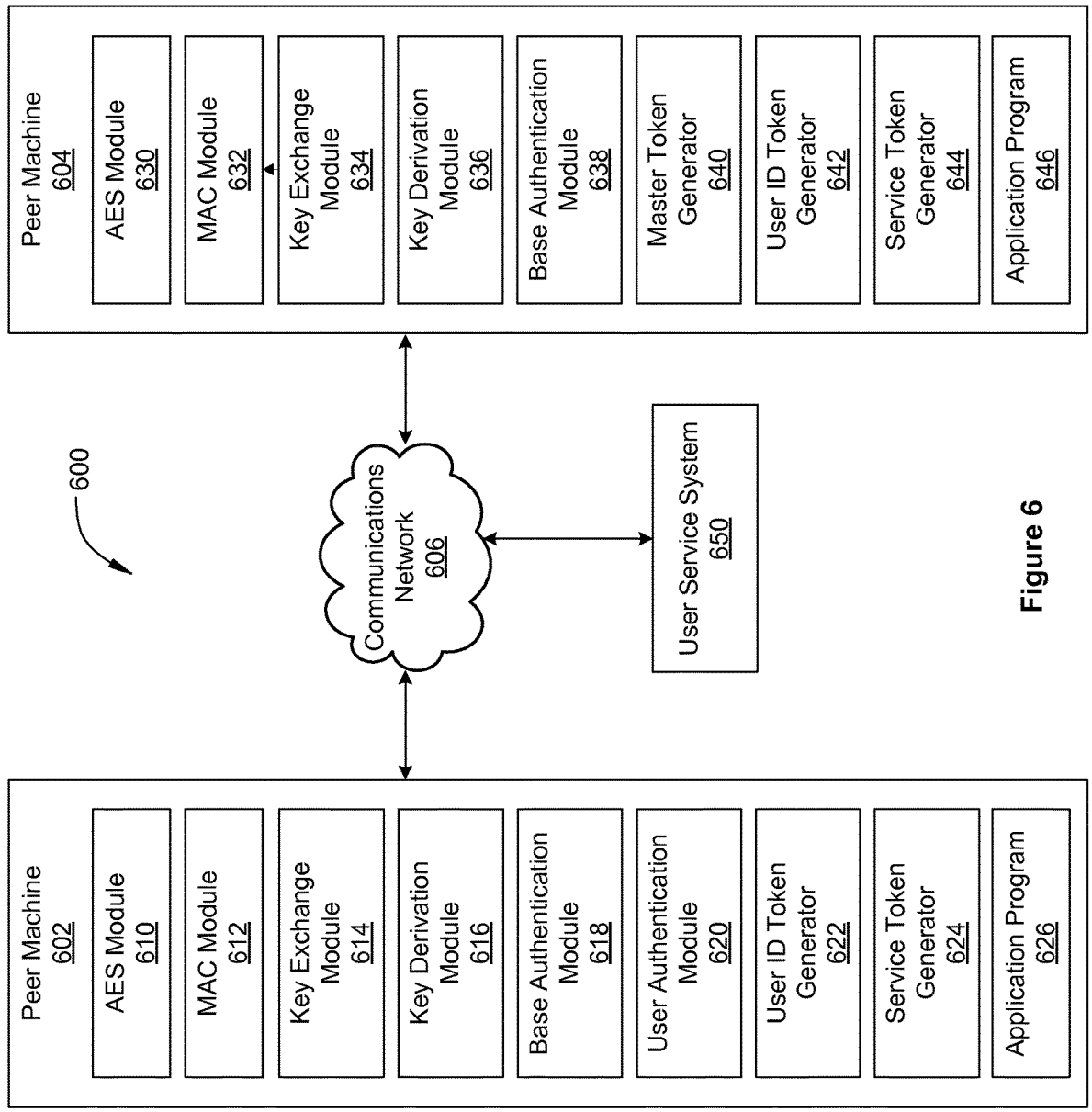
FIG. 6 illustrates a computer network having peer-to-peer machines configured to implement one or more aspects of the present invention.

FIG. 6 illustrates a computer network having peer-to-peer machines configured to implement one or more aspects of the present invention. As shown, the computer network 600 includes, without limitation, peer machines 602 and 604, and a user service system 650 connected to each other via a communications network 606. The communications network 606 may be any suitable environment to enable communications among remotely located machines, including, without limitation, a LAN (Local Area Network) and a WAN (Wide Area Network).

Each peer machine 602 and 604 each include an AES module 610 and 630, a MAC module 612 and 632, a key exchange module 614 and 634, a key derivation module 616 and 636, a base authentication module 618 and 638, a master token generator 620 and 640, a user ID token generator 622 and 642, a service token generator 624 and 644, and an application program 626 and 646. These various modules, token generators, and application programs function substantially the same as described in conjunction with FIG. 2 except as further described below.

In some embodiments, secure communications may be accommodated in a peer-to-peer (p2p) environment via trust-on-first-use (TOFU) authentication. If a peer master token is included, the recipient of the message is expected to use the peer master token as the master token of the reply. Similarly if a peer user ID token or peer service tokens are included the recipient is expected to use peer user ID token or peer service tokens as the user ID token and service tokens, respectively, of the reply. This approach may be used in peer-to-peer configurations to allow each entity to identify itself to the other with correctly bound tokens: the peer user ID token may be bound to the peer master token or key response data master token; any master token- or user ID token-bound peer service tokens may be validated against the peer master token and peer user ID token. The master token, user ID token, and service tokens of a request become the peer tokens of the reply.

In peer-to-peer mode, a first peer machine (peer A) transmits a first message to a second peer machine (peer B) that includes entity authentication data associated with the first peer machine along with key request data. The entity authentication data identifies the first peer machine to the second peer machine, while the key request data is a request to exchange session keys for a new secure communications session. In some embodiments, if the protocol to set up a new session between the first peer machine and the second peer machine is capable of encryption, then the first message may be encrypted, and the first message may optionally include user authentication data and payload data. If, on the other hand, the protocol to set up a new session between the first peer machine and the second peer machine is not capable of encryption, then the first message data does not include secure information, such as user authentication data and payload data.

In response to the key request data included in the first message, the second peer machine issues a master token. The second peer machine transmits a second message to the first peer machine that includes entity authentication data associated with the second peer machine, key request data. The second message also includes key response data corresponding to the received key request data, where the key response data includes the master token issued by the second peer machine.

In response to the key request data included in the second message, the first peer machine issues a master token. The first peer machine transmits a third message to the second peer machine that includes key response data corresponding the received key request data, where the key response data includes the master token issued by the first peer machine. The third message also includes the master token issued by the second peer machine. The third message is encrypted via session keys associated with the master token issued by the second peer machine.

A secure communication channel is now established between the first peer machine and the second peer machine. When either peer machine transmits a message to the other peer machine over the secure communications channel, the peer machine encrypts the message via the session keys associated with the master token issued by the receiving peer machine. The peer machine includes the master token issued by the receiving peer machine in the transmitted message. In some embodiments, a peer machine can encrypt messages using session keys associated with the master token issued by the receiving machine, but cannot decrypt such messages. In other embodiments, two peer machines may communicate via a single master token and a single set of session keys. In such embodiments, each peer machine encrypts and decrypts all exchanged messages via the single set of session keys. In general, a peer machine cannot decrypt a master token issued by a different peer machine, whether or not a single set of session keys is used to encrypt and decrypt messages.

In the case of TOFU, each peer machine participates in a key exchange that is initially unauthenticated. This first unauthenticated key exchange is vulnerable to a man-in-the-middle attack. However, after the peer machines have established first trust, assuming the peer machines were not attacked on the first transaction, the peer machines are now trusted peers. As trusted peers, the peer machines are now able to renew master tokens as needed to refresh session keys and perform other related operations.

If a peer master token is included in a MSL message, then the recipient of the message is expected to use the peer master token as the master token of the reply message. Similarly, if a peer user ID token or peer service tokens are included in a MSL message, then the recipient is expected to use the peer user ID token or peer service tokens as the user ID token and service tokens of the reply message. This approach is used in peer-to-peer configurations to allow each entity to identify and authenticate the other entity with correctly bound tokens. The peer user ID token is bound to the peer master token or key response data associated with the master token. Any master token-bound or user ID token-bound peer service tokens are validated against the peer master token and peer user ID token, respectively. The master token, user ID token, and service tokens of a request become the peer tokens of the reply message.

In one embodiment, p2p and TOFU may be deployed independently. In one example, credentials could be shared out-of-band with a peer using p2p mode without deploying TOFU. In another example, a trusted network (as opposed to a p2p network) could bootstrap clients using TOFU.

Figure 7:
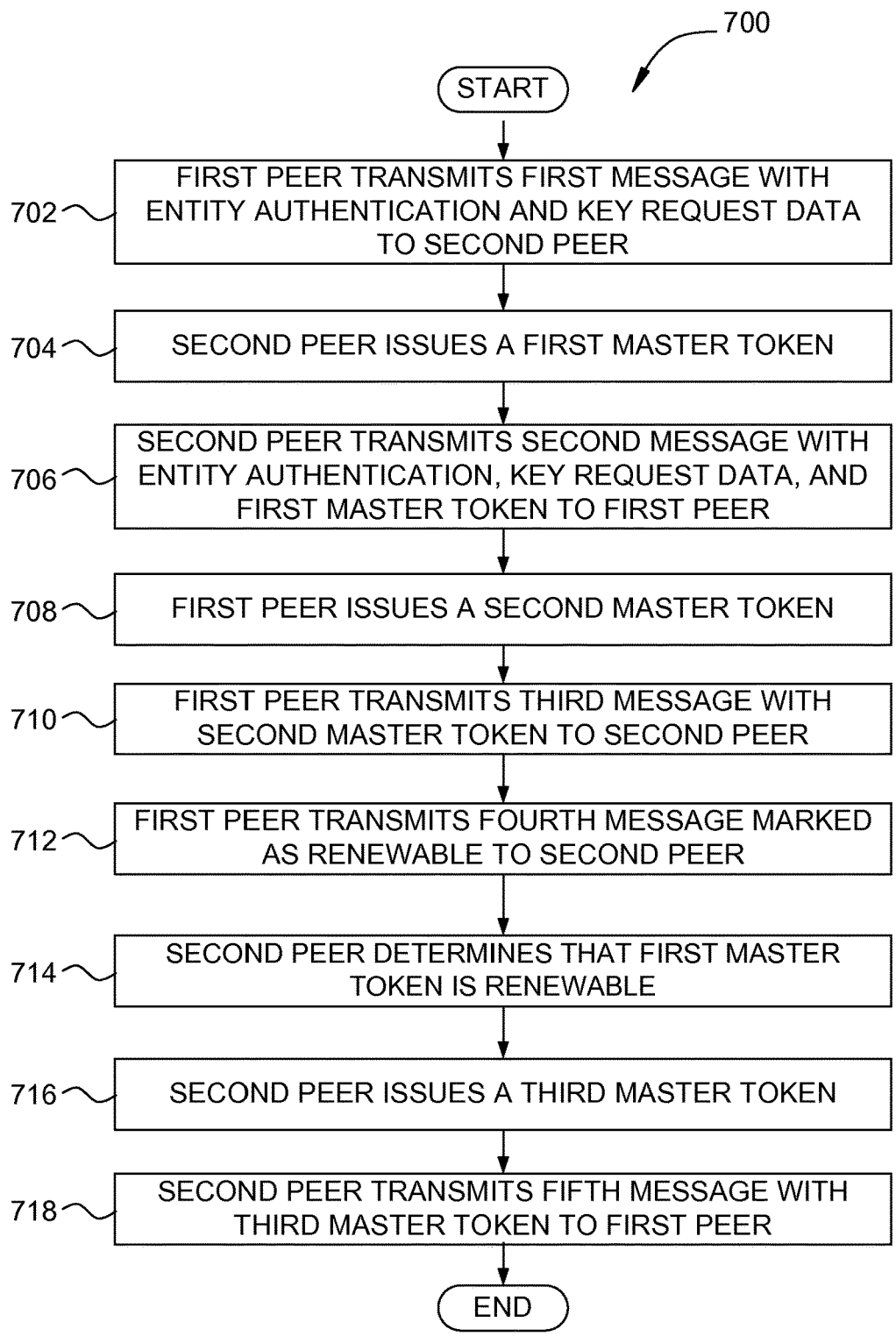
FIG. 7 is a flow diagram of method steps for establishing a secure communication channel between peer machines via renewable tokens, according to one embodiment of the present invention.

FIG. 7 is a flow diagram of method steps for establishing a secure communication channel between peer machines via renewable tokens, according to one embodiment of the present invention. Although the method steps are described in conjunction with the systems of FIGS. 1-2 and 6, persons of ordinary skill in the art will understand that any system configured to perform the method steps, in any order, is within the scope of the present invention.

As shown, a method 700 begins at step 702 where a first peer machine transmits a first message to a second peer machine that includes entity authentication data associated with the first peer machine along with key request data. In some embodiments, the first message may be encrypted if the protocol to set up a new session between the first peer machine and the second peer machine is capable of encryption. At step 704, the second peer machine issues a first master token in response to the key request data included in the first message. At step 706, the second peer machine transmits a second message to the first peer machine that includes entity authentication data associated with the second peer machine, key request data. The second message also includes key response data corresponding to the received key request data, where the key response data includes the first master token issued by the second peer machine.

At step 708, in response to the key request data included in the second message, the first peer machine issues a second master token. At step 710, the first peer machine transmits a third message to the second peer machine that includes key response data corresponding the received key request data, where the key response data includes the second master token issued by the first peer machine. The third message also includes the first master token issued by the second peer machine. The third message is encrypted via session keys associated with the first master token issued by the second peer machine.

At step 712 the first peer machine transmits a fourth message to the second peer machine that is marked as renewable. At step 714, the second peer machine determines that the first master token is renewable. In some embodiments, determining that the first master token is renewable includes determining that a current time is greater than a renewal time associated with the first master token and less than an expiration time associated with the first master token. In some embodiments, determining that the first master token is renewable includes determining that a current time is greater than an expiration time associated with the first master token. At step 716, the second peer machine issues a third master token. At step 718, the second peer machine transmits a fifth message to the first peer machine that includes key response data that includes the third master token issued by the second peer machine. The method 700 then terminates.

In sum, a master token issued by a server machine is associated with two times, a renewal time and an expiration time, that govern the maximum amount of time the master token may be used before the master token is renewed. The master token becomes renewable after the renewal time. After the renewal time, the server machine may renew the master token upon receiving a message that is identified as renewable. After the expiration time, no further messages using the expired master token are accepted by the server machine except for a message that requests a new master token. Other tokens may be bound to the master token for additional security. For example, a user ID token may be bound to the master token, where the user ID token is associated with credentials for a particular user. Further, one or more application-specific service tokens may be bound to the master token, where each of the service tokens includes security information related to a particular application program. User ID, service, and other tokens that are bound to the master token are renewed when the master token is renewed, resulting in improved security and a reduction in the likelihood of unintended interception of secure messages.

At least one advantage of the disclosed approach is that the master token is renewed regularly to limit prolonged and repeated use of a master token, leading to a reduced likelihood that messages are intercepted and decrypted by an unintended third party. Another advantage of the disclosed approach is that service tokens bound to the master token are also renewed when the master token is renewed, leading to a reduced likelihood that application-specific security information is compromised by a third party. Further, compromise of the session keys from one session does not compromise the security of other sessions when used in conjunction with a key exchange mechanism with perfect forward secrecy, such as Diffie-Hellman.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the subject matter described herein are set out in the following numbered clauses.

1. A program product comprising a non-transitory computer-readable storage medium including instructions that, when executed by a processor, cause the processor to perform the steps of receiving, from a client machine, a first message that is associated with a first sequence number included in a first master token; verifying that the first message includes a non-replayable identifier and that the first sequence number corresponds to a previously generated and stored sequence number; in response to verifying that the first message includes a non-replayable identifier, generating a second master token comprising a second sequence number that is different than both the first sequence number and the previously generated sequence number; and transmitting, to the client machine, a second message that includes the second master token.

2. The program product of clause 1, further comprising, prior to verifying, receiving one or more additional messages from the client machine.

3. The program product of either clause 1 or clause 2, further comprising, transmitting, to the client machine, a third message that includes the second sequence number.

4. The program product of any of clauses 1-3, wherein verifying that the first sequence number corresponds to the previously generated sequence number comprises determining that the first sequence number and the previously generated sequence number are equal to one another.

5. The program product of any of clauses 1-4, wherein verifying that the first sequence number corresponds to the previously generated sequence number comprises determining that the first sequence number and the previously generated sequence number are within an allowable range of one another.

6. The program product of any of clauses 1-5, wherein the previously generated sequence number is inaccessible by the client machine.

7. A first peer machine, comprising a processor; and a memory coupled to the processor and including a master token generator; wherein, when executed by the processor, the master token generator is configured to receive, from a second peer machine, a first message that includes entity authentication data associated with the second peer machine and first key request data, transmit, to the second peer machine, a second message that includes entity authentication data associated with the first peer machine, second key request data, and a first master token issued by the first peer machine, wherein the first master token includes first key exchange data for encrypting messages transmitted to the first peer machine, and receive, from the second peer machine, a third message that includes a second master token issued by the second peer machine, wherein the second master token includes second key exchange data for encrypting messages transmitted to the first peer machine.

8. The first peer machine of clause 7, wherein the memory further includes a base authentication module, and, when executed by the processor, the base authentication module is configured to authenticate the first message based on the entity authentication data associated with the second peer machine; and cause the second peer machine to authenticate the second message based on the entity authentication data associated with the first peer machine.

9. The first peer machine of either clause 7 or clause 8, when executed by the processor, the master token generator is further configured to receive, from the second peer machine, a fourth message that marked as renewable; determine that a current time exceeds at least one of a renewal time and an expiration time associated with the first master token; in response, transmit, to the second peer machine, a fifth message that includes a third master token issued by the first peer machine, wherein the third master token includes third key exchange data for encrypting messages transmitted to the first peer machine.

10. The first peer machine of any of clauses 7-9, wherein the memory further includes a key exchange module, and when executed by the processor, the key exchange module is configured to decrypt payload data included in the third message based on at least one session key included in a plurality of session keys associated with the first key exchange data.

11. A method, comprising receiving a plurality of messages from a client machine over a secure communication channel, wherein the plurality of messages includes a first message comprising at least two of user authentication data, entity authentication data, first key exchange data, and encrypted message data; and transmitting, to the client machine, a second message that includes a first master token comprising second key exchange data associated with the first key exchange data and at least one of a first renewal time and a first expiration time.

12. The method of clause 11, wherein the first message includes user authentication data, and further comprising issuing a user identification token associated with the user authentication data and including an identifier associated with a user; and binding the user identification token to the master token, wherein the first master token further comprises an entity identifier associated with a server entity.

13. The method of either clause 11 or clause 12, wherein the first message is associated with a service, and further comprising issuing a service token that includes a data set specified by the service and included in the first message; and binding the service token to the first master token.

14. The method of any of clauses 11-13 the first message is associated with a service, and further comprising issuing a service token that includes a data set specified by the service and included in the first message; and binding the service token to the user identification token.

15. The method of any of clauses 11-14, wherein at least one of the first master token and the user identification token includes state information associated with the client machine.

16. The method of any of clauses 11-15, further comprising: receiving, from the client machine, a third message that is marked as renewable; and transmitting, to the client machine, a fourth message that includes a second master token comprising third key exchange data and at least one of a second renewal time and a second expiration time.

17. The method of any of clauses 11-16, wherein a current time is greater than the first renewal time and less than the first expiration time.

18. The method of any of clauses 11-17, wherein a current time is greater than the first expiration time.

19. The method of any of clauses 11-18, wherein the secure communication channel is part of a trusted services network.

20. The method of any of clauses 11-19, wherein the third key exchange data is wrapped with at least one session key included in a plurality of session keys associated with the second key exchange data.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A first peer machine, comprising:
a processor; and
a memory coupled to the processor and including one or more instructions that, when executed by the processor, cause the processor to:
receive, from a second peer machine, a first message that includes entity authentication data associated with the second peer machine, user authentication data, and first key request data, wherein the user authentication data is associated with a user identification token,
transmit, to the second peer machine, a second message that includes entity authentication data associated with the first peer machine, second key request data, and a first master token issued by the first peer machine, wherein the first master token is generated by issuing and encrypting a pre-master token that includes a renewal time, a sequence number, and first key exchange data for encrypting messages transmitted to the first peer machine, wherein the renewal time indicates an earliest time, subsequent to the first master token being issued, that the first master token is eligible to be renewed, and wherein the first master token is renewed in response to a renewal message received from the second peer machine, and
receive, from the second peer machine, a third message that includes a second master token issued by the second peer machine, wherein the second master token includes second key exchange data for encrypting messages transmitted to the second peer machine.

2. The first peer machine of claim 1, wherein the memory further includes a base authentication module, and, when executed by the processor, the base authentication module is configured to:
authenticate the first message based on the entity authentication data associated with the second peer machine; and
cause the second peer machine to authenticate the second message based on the entity authentication data associated with the first peer machine.

3. The first peer machine of claim 1, wherein the one or more instructions, when executed by the processor, cause the processor to:
receive, from the second peer machine, a fourth message that includes a renewable flag;
in response to the fourth message, determine that a current time exceeds at least one of the renewal time and an expiration time associated with the first master token; and in response, transmit, to the second peer machine, a fifth message that includes a third master token issued by the first peer machine, wherein the third master token includes third key exchange data for encrypting messages transmitted to the first peer machine.

4. The first peer machine of claim 1, wherein:
the memory further includes a key exchange module, and when executed by the processor, the key exchange module is configured to:
decrypt payload data included in the third message based on at least one session key included in a plurality of session keys associated with the first key exchange data.

5. A method, comprising:
receiving a plurality of messages from a client machine over a secure communication channel, wherein the plurality of messages includes a first message comprising at least two of user authentication data, entity authentication data, first key exchange data, and encrypted message data, wherein the user authentication data is associated with a user identification token; and
transmitting, to the client machine, a second message that includes a first master token that is generated by issuing and encrypting a pre-master token comprising a renewal time, a sequence number, and second key exchange data associated with the first key exchange data, wherein the renewal time indicates an earliest time, subsequent to the first master token being issued, that the first master token is eligible to be renewed, and wherein the first master token is renewed in response to a renewal message received from the client machine.

6. The method of claim 5, wherein the user identification token associated with the user authentication data includes an identifier associated with a user, and wherein the first master token further comprises an entity identifier associated with a server entity.

7. The method of claim 6, wherein the first message is associated with a service, and further comprising:
issuing a service token that includes a data set specified by the service and included in the first message; and
binding the service token to the first master token.

8. The method of claim 6, wherein the first message is associated with a service, and further comprising:
issuing a service token that includes a data set specified by the service and included in the first message; and
binding the service token to the user identification token.

9. The method of claim 6, wherein at least one of the first master token and the user identification token includes state information associated with the client machine.

10. The method of claim 5, further comprising:
receiving, from the client machine, a third message that includes a renewable flag; and
transmitting, to the client machine, a fourth message that includes a second master token comprising third key exchange data and a second renewal time.

11. The method of claim 10, wherein a current time associated with the third message is greater than the renewal time and less than an expiration time.

12. The method of claim 10, wherein a current time associated with the third message is greater than an expiration time.

13. The method of claim 10, wherein the secure communication channel is part of a trusted services network.

14. The method of claim 10, wherein the third key exchange data is wrapped with at least one session key included in a plurality of session keys associated with the second key exchange data.

15. One or more non-transitory computer readable media storing instructions that, when executed by one or more processors, cause the one or more processors to perform the steps of:
- receiving a plurality of messages from a client machine over a secure communication channel, wherein the plurality of messages includes a first message comprising at least two of user authentication data, entity authentication data, first key exchange data, and encrypted message data, wherein the user authentication data is associated with a user identification token; and
- transmitting, to the client machine, a second message that includes a first master token that is generated by issuing and encrypting a pre-master token comprising a renewal time, a sequence number, and second key exchange data associated with the first key exchange data, wherein the renewal time indicates an earliest time, subsequent to the first master token being issued, that the first master token is eligible to be renewed, and wherein the first master token is renewed in response to a renewal message received from the client machine.

16. The one or more non-transitory computer readable media of claim 15, wherein the user identification token associated with the user authentication data includes an identifier associated with a user, and wherein the first master token further comprises an entity identifier associated with a server entity.

17. The one or more non-transitory computer readable media of claim 16, wherein the first message is associated with a service, and further comprising:
- issuing a service token that includes a data set specified by the service and included in the first message; and
- binding the service token to the first master token.

18. The one or more non-transitory computer readable media of claim 16, wherein the first message is associated with a service, and further comprising:
- issuing a service token that includes a data set specified by the service and included in the first message; and
- binding the service token to the user identification token.

19. The one or more non-transitory computer readable media of claim 16, wherein at least one of the first master token and the user identification token includes state information associated with the client machine.

20. The one or more non-transitory computer readable media of claim 15, further comprising:
- receiving, from the client machine, a third message that includes a renewable flag; and
- transmitting, to the client machine, a fourth message that includes a second master token comprising third key exchange data and a second renewal time.

21. The first peer machine of claim 1, wherein a renewal request associated with the renewal message is disallowed when the sequence number found in the first master token does not match an expected value.

22. The first peer machine of claim 1, wherein the sequence number is modified based on whether a prior master token renewal has occurred within a range of time relative to the renewal time and before an expiration time.

23. The first peer machine of claim 1, wherein the second master token is generated using a second renewal time that is associated with the second peer machine.

* * * * *

UNITED STATES PATENT AND TRADEMARK OFFICE
CERTIFICATE OF CORRECTION

| | |
|---|---|
| PATENT NO. | : 11,533,297 B2 |
| APPLICATION NO. | : 14/920657 |
| DATED | : December 20, 2022 |
| INVENTOR(S) | : James Mitchell Zollinger and Wesley Miaw |

It is certified that error appears in the above-identified patent and that said Letters Patent is hereby corrected as shown below:

On the Title Page

Page 2, Column 2, (56) References Cited under Other Publications, Line 9:
Please delete "Canesan, R., "Yaksha: augmenting Kerberos with public key cryptography", Network and Distributed System Security, 1995, Proceedings of the Symposium on San Diego, CA, February 16-17, 1995, Los Alamitos, CA, IEEE Comput. Soc, February 16, 1995, pages 132-143, XP010134533." and insert --Ganesan, R., "Yaksha: augmenting Kerberos with public key cryptography", Network and Distributed System Security, 1995, Proceedings of the Symposium on San Diego, CA, February 16-17, 1995, Los Alamitos, CA, IEEE Comput. Soc, February 16, 1995, pages 132-143, XP010134533.--.

Signed and Sealed this
Twenty-eighth Day of February, 2023

Katherine Kelly Vidal
*Director of the United States Patent and Trademark Office*